United States Patent [19]

Tsimerman

[11] Patent Number: 5,212,956
[45] Date of Patent: May 25, 1993

[54] METHOD AND APPARATUS FOR GAS COOLING

[75] Inventor: Alexandre Tsimerman, Odessa, U.S.S.R.

[73] Assignee: Ari-Tec Marketing, Inc., Phoenix, Ariz.

[21] Appl. No.: 763,647

[22] Filed: Sep. 23, 1991

Related U.S. Application Data

[63] Continuation-in-part of Ser. No. 642,897, Jan. 18, 1991, Pat. No. 5,050,391.

[51] Int. Cl.$^5$ ............................................. F25D 17/06
[52] U.S. Cl. ............................................. 62/94; 62/271; 62/304; 62/311; 62/316; 62/309; 261/153
[58] Field of Search ............... 62/94, 271, 304, 311, 62/316, 309; 165/104.11; 261/153

[56] References Cited

U.S. PATENT DOCUMENTS 1,970,301  8/1934  Frankel .................................. 62/94
2,926,502  3/1960  Munters et al. ........................ 62/271

Primary Examiner—John M. Sollecito
Attorney, Agent, or Firm—Gregory J. Nelson

[57] ABSTRACT

A low energy consumption apparatus and method for treating a gas in which a main gas stream is cooled and heat is transferred by convection to a liquid and to a secondary gas stream across a heat transfer surface. Liquid evaporates into the secondary stream. A total gas stream is subjected to initial sensible cooling along a moisture impervious surface of a heat exchange element. A secondary gas stream is diverted from the total discharge from the initial cooling stage and is directed counterflow to the total stream at the opposite absorbent surface of the heat exchange element to cause heating and humidification of the secondary stream. The remaining cooled stream which is the primary stream is subjected to sorbent treatment in an absorbent media to heat and dehumidify the stream. The primary gas flow is subjected to a final treatment stage similar to the initial heat exchange treatment. Condensate may be removed from the saturated or near-saturated secondary flow. The primary flow may also be subjected to intermediate cooling treatment. The initial and final dry cooling stages preferably include an adiabatic cooling zone. The secondary flow from the initial heat exchanger may be subdivided into two streams, one is dehumidified in the sorbtion device by an auxiliary heater and is used for regeneration of the absorbent media and the other is used to cool the primary air stream.

26 Claims, 11 Drawing Sheets

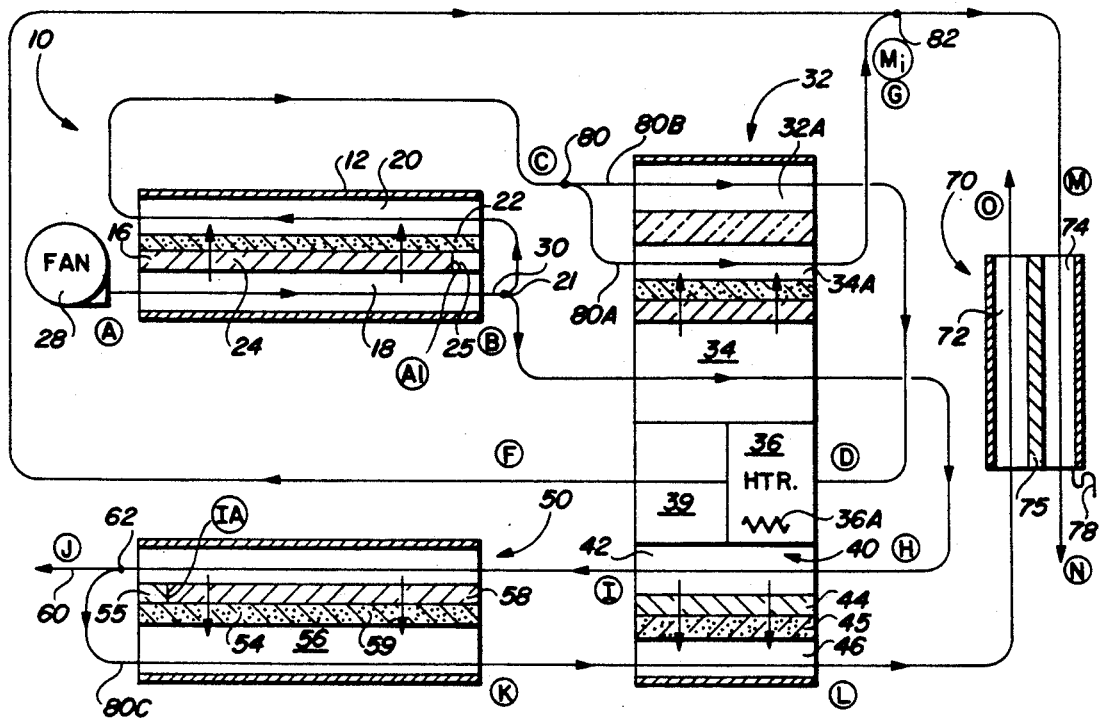
FIG-1
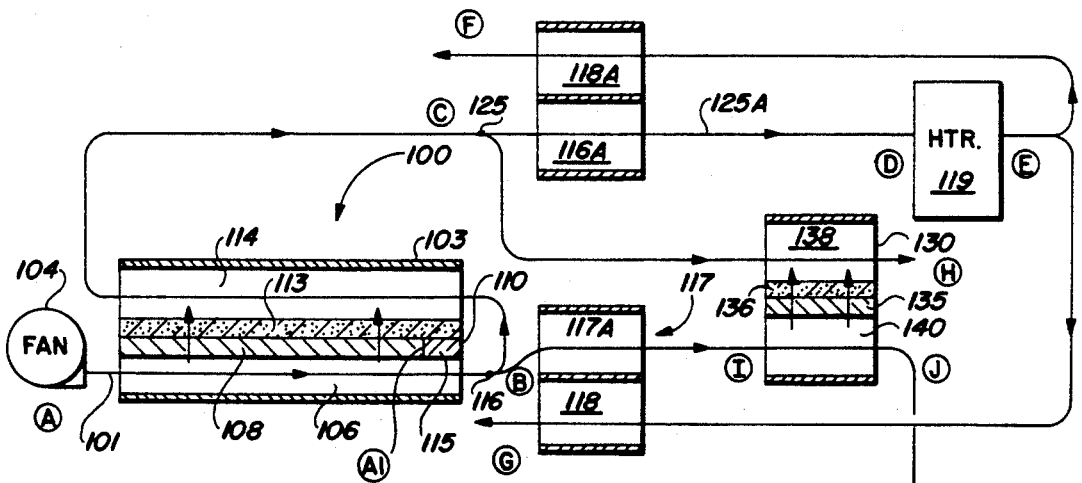
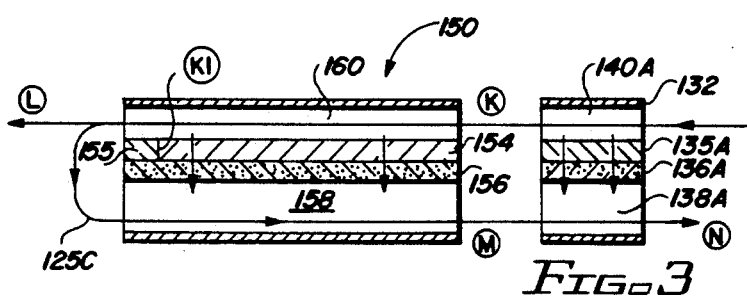
FIG-3

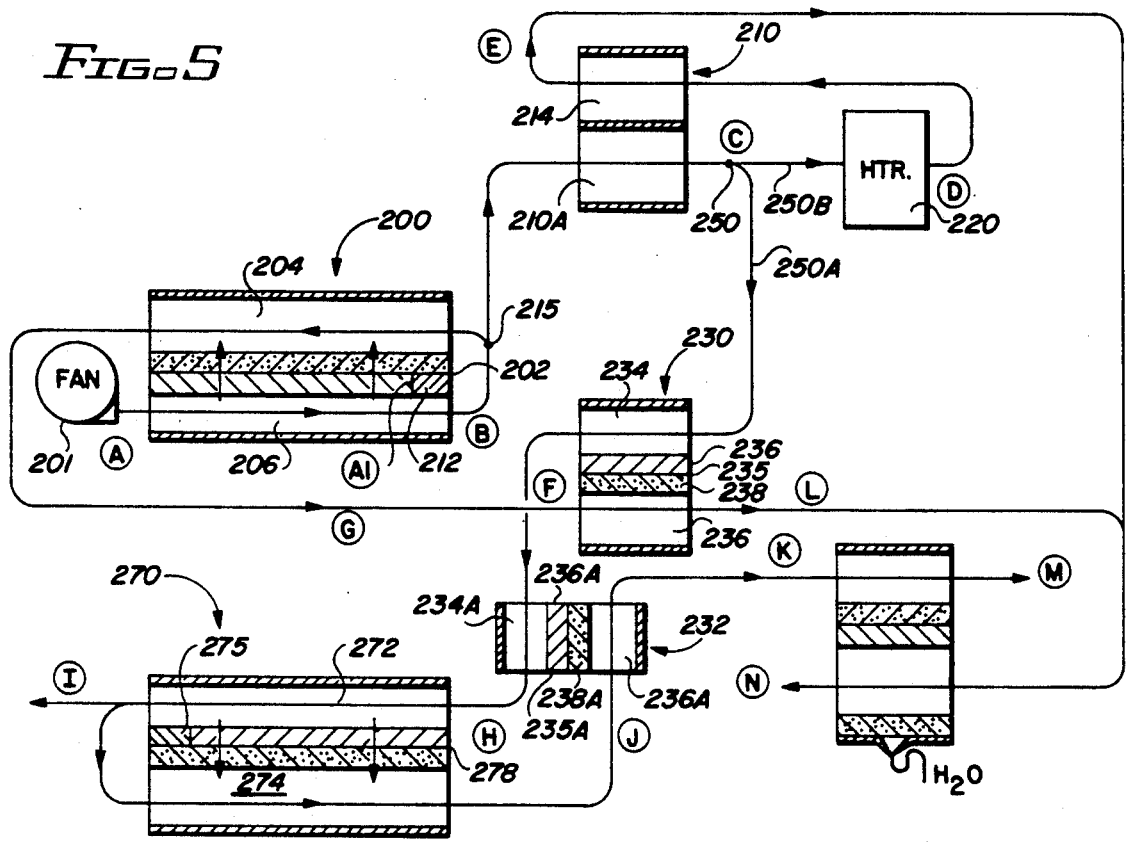
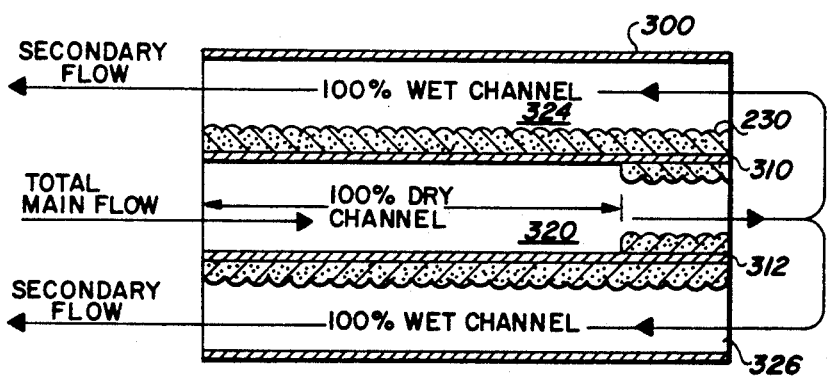
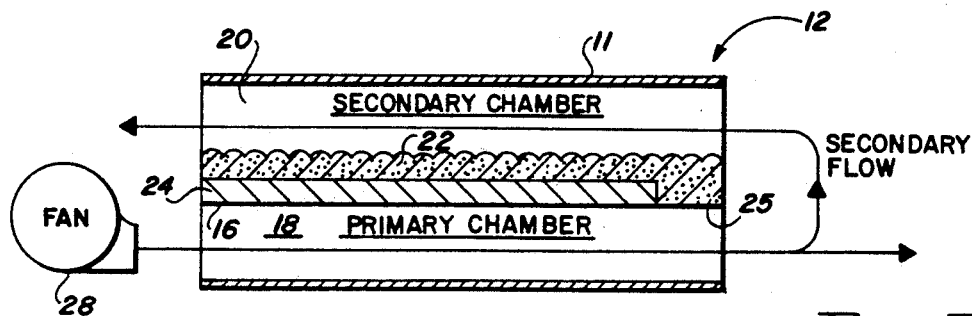

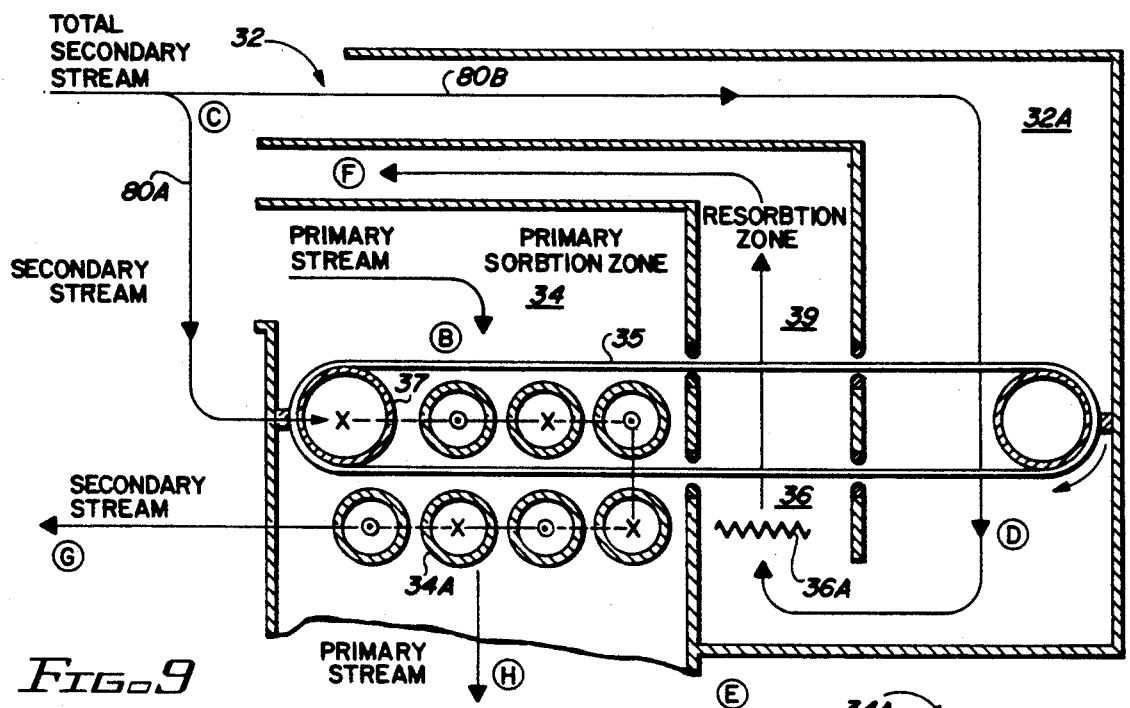
FIG. 9
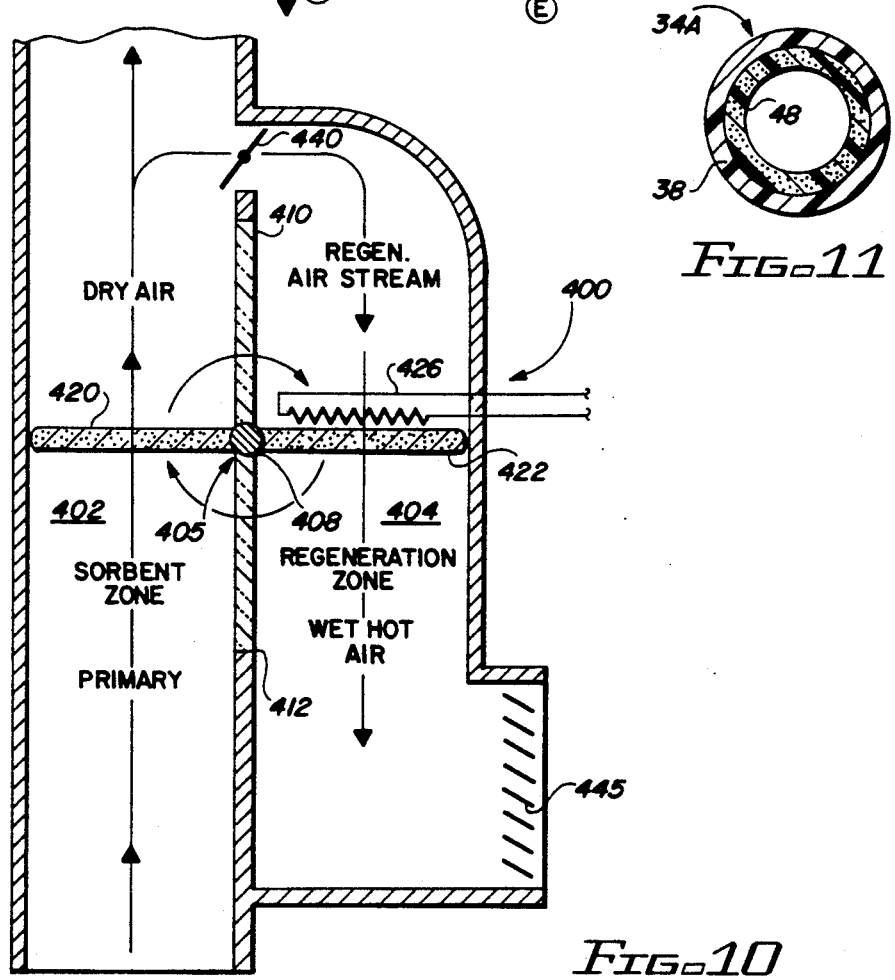
FIG. 10
FIG. 11

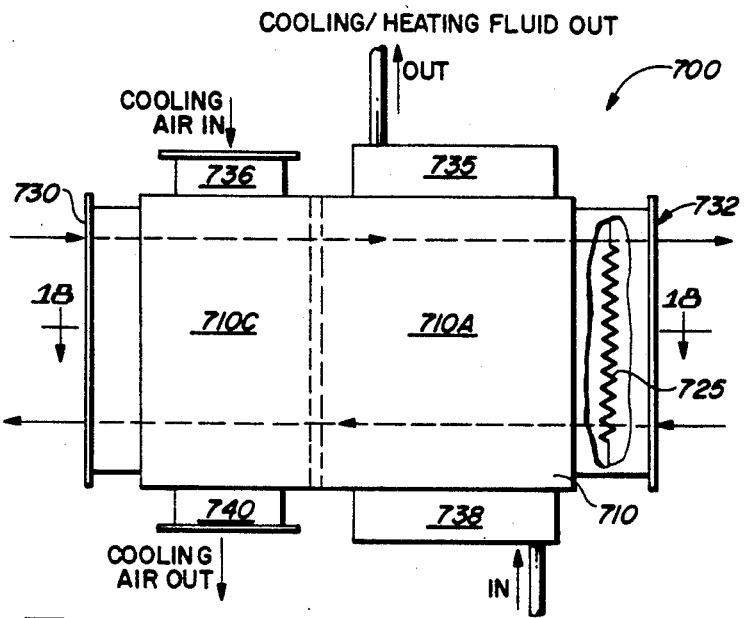
FIG-16
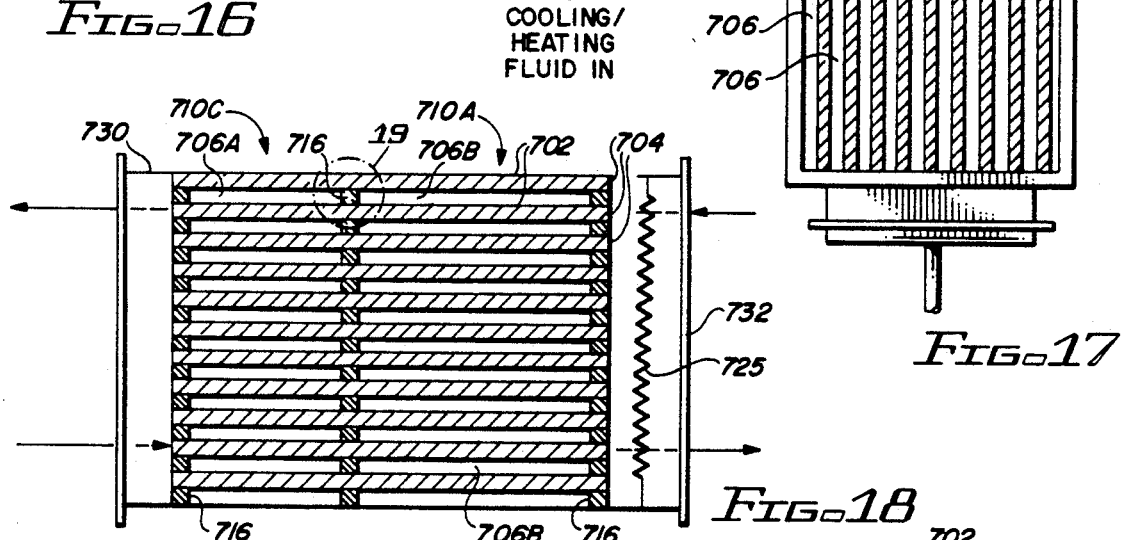
FIG-17
FIG-18
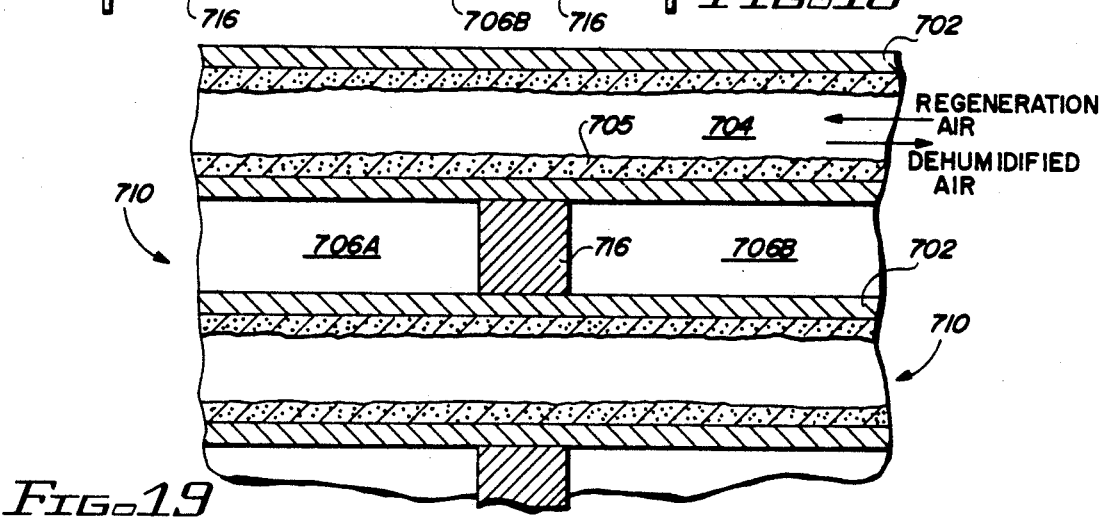
FIG-19

METHOD AND APPARATUS FOR GAS COOLING

The present application is a continuation-in-part of application Ser. No. 07/642,897, filed Jan. 18, 1991, entitled "Method And Apparatus For Gas Cooling", now U.S. Pat. No. 5,050,391.

The present invention relates to a gas treatment method and more particularly to a unique method and apparatus for cooling of air and other gases utilizing evaporative cooling and sorbent dehumidification.

Conditioning of air to cool the air to create a zone of increased comfort is well known. One such method practiced in dry, hot regions such as the Southwestern United States involves direct evaporative air cooling. Direct evaporative cooling has wide application as it is quite simple requiring low energy consumption. The principle of evaporative air cooling is based on the evaporation of water to absorb the latent heat of evaporization from the air which reduces temperature and increases humidity. However, direct evaporative cooling of this type has an inherent limitation due to the fact that when the humidity of the air flow reaches saturation, the temperature and partial pressures equalize and the heat and mass exchange process ceases.

Accordingly, refrigeration devices operating on the compression cycle using a refrigerant such as Freon have become widely used. Compression cycle systems require considerable energy consumption and are expensive in initial cost and maintenance. More importantly, certain ecological problems have been attributed to compression systems for generating cool air. These systems utilize a great deal of energy and are also believed to contribute to environmental pollution. CFC molecules released to the atmosphere from compression cycle refrigeration systems may enter into photochemical reactions, reacting with the ozone layer to destroy this environmentally necessary protection.

Accordingly, due to these problems and increased environmental awareness, there has been renewed interest in evaporative cooling systems. State-of-the-art evaporative systems are capable of achieving relatively low temperatures. The term "evaporative gas cooling" as used herein refers to a type of evaporative cooling in which gas cooling occurs at one side of a dry heat transfer surface with the same type of gas undergoing heating and humidification at the opposite side of the heat exchanger surface as evaporization of a liquid occurs.

With the present evaporative method of cooling, heat and humidity transfer is realized because of the availability of two gas streams in which:

(1) The main gas stream is cooled and heat is transferred by convection to a liquid and a secondary gas stream through the heat transfer surface; and (2) Liquid bearing the heat from the main stream evaporates into the secondary gas stream.

Early work in this area was done by the present applicant, Dr. Tsimerman, and others in the U.S.S.R. This work is disclosed in Russian Inventor's Certificate N407519 and also described in a paper entitled "Method of Indirect Evaporative Cooling and Household Electrical Appliances" published by the Ministry For Hire and Secondary Special Education, U.S.S.R. (1977) which discloses a component utilized in the system of the present invention.

Others, apparently following the concepts described in the above-mentioned publication, have developed various cooling methods.

U.S. Pat. No. 4,380,910 describes a multi-stage, indirect, direct evaporative cooling process and apparatus in which a supply of low-humidity ambient air is introduced into an evaporative cooler where such air is indirectly cooled without an increase in moisture content by a first re-circulating water evaporative unit in a first and second stage unit. The air is then further directly and indirectly cooled by a second re-circulating water evaporative unit in a third and fourth stage unit. In the third and fourth stages, the air which is cooled indirectly is used to cool the re-circulating water in the direct cooling phase of the evaporative unit of the fourth stage.

U.S. Pat. No. 4,854,129 discloses a method of cooling air and a cooling apparatus in which primary air is passed at least through one primary chamber to provide secondary air at an outlet chamber. Secondary air is passed in a counterflow direction through at least one secondary chamber which is in heat exchange relationship with the primary chamber.

Other patents representative of the prior art in this are as follows:

U.S. Pat. No. 3,362,186, A. G. Patterson, Jan. 9, 1968
U.S. Pat. No. 3,713,008, L. M. Zusmanovich, Feb. 27, 1973
U.S. Pat. No. 3,905,205, L. M. Zusmanovich, Sep. 16, 1975
U.S. Pat. No. 4,156,351, L. A. Schlom, May 29, 1979
U.S. Pat. No. 4,674,295, T. C. Curtis, Sr., Jun. 23, 1987
U.S. Pat. No. 4,713,943, C. E. Wainwright, Dec. 22, 1987
U.S. Pat. No. 4,842,052, Gershuni et al, Jun. 27, 1989
U.S. Pat. No. 4,935,169, G. Ernst, Jun. 19, 1980
JP 57-74582, May, 1982
USSR 553402, April, 1977
USSR 335509, Dec. 12, 1972

With the prior art systems listed above, the final conditions of the air are limited by the dew point temperature of the ambient air. The dry bulb temperature of the air discharged from these systems will approach but cannot reach the dew point temperature of the initial air.

The principal object of the present invention is to provide an improved gas cooling system which will achieve final gas or air temperatures significantly lower than the dew point of the input air.

Another object is to provide a gas cooling system which is economical in energy consumption.

A further object is the provision of such an apparatus and system which operates on a principle of evaporation of different liquids into a pre-dried gas stream, the liquids having a low partial vapor pressure.

Briefly, the method and apparatus of the present invention is used for cooling a gas, such as air. The term "air" will be used for simplicity throughout, it being appreciated that other gases such as hydrogen, nitrogen, and $CO_2$ may also be treated by the present invention. Any two-atom gas or mixtures of such gases may be treated in accordance with the invention.

An initial total stream of moistened air is first introduced into a pre-cooling zone by an air mover. The pre-cooling zone defines a chamber subdivided by a heat exchange element into a primary chamber and a secondary chamber. The heat exchange element is specially constructed having a moisture-impervious surface or barrier exposed to the primary chamber and a liquid absorbent surface exposed to the secondary chamber.

The total air stream to be treated flows through the primary chamber where dry cooling occurs which may also be termed "sensible cooling". A portion of the total stream is diverted creating a primary and a secondary air stream. The secondary stream is directed countercurrently through the secondary chamber of the initial heat exchanger. In the secondary chamber, the moving air is humidified and heated causing heat to be extracted from the total air flow in the primary chamber across the heat exchange element. The primary air flow is then directed to a sorbent zone where the primary stream air is heated and dried to a lower absolute humidity. "Sorbent" or "sorption" is used herein to describe a zone or condition where liquid is removed from the gas or air stream and heating occurs. The regeneration enerby for the sorption stage may be from external heat source and the heated air from the secondary stream may be used to accomplish desorption or regeneration of the saturated adsorbent material.

In the sorption stage, the temperature of the primary stream is increased and the absolute humidity decreased preferably through contact with a continually regenerated adsorptive media. Thereafter, the primary stream is directed to a final dry cooling stage, again having a heat transfer element with a liquid impervious surface exposed to a dry cooling chamber and a liquid absorbent surface exposed to a heating and humidification chamber. The primary stream flows through the dry cooling chamber along the impervious heat exchange surface and further cooling occurs. A portion of the primary finally-treated air stream is directed countercurrently through the final heat exchanger along the liquid absorbent surface of the heat exchanger element. One or more intermediate dry cooling stages may be interposed between the sorption stage and the final cooling stage. A portion of the dry cooling zones of the initial and final heat exchanger stages may include zones of adiabatic cooling.

The secondary air stream from the final cooling or intermediate cooling stage, may be directed to one side of a condenser with the secondary air stream from the initial dry evaporative pre-cooling stage directed to the other side of the condenser at which point pure condensate may be extracted. In various system configurations, heated air may be withdrawn from the secondary air stream at various locations within the system.

Typically, if the total air stream entering the system is approximately 115° F. with 25% relative humidity, the final temperature will be lowered to approximately 40° F. with a relative humidity of 70%.

The present invention will be better understood from the following description, claims and drawings in which:

FIG. 1 is a schematic flow chart illustrating the process and apparatus of the present invention;

FIG. 3 is a schematic flow chart of an alternate embodiment of the system of the present invention;

FIG. 5 is a schematic flow chart still of another embodiment of the system of the present invention;

FIG. 7 is a cross-sectional view illustrating a heat exchanger and the heat transfer element of the type which may be used for initial and final treatment;

FIG. 8 illustrates a section of an alternate construction heat exchanger;

FIG. 9 illustrates a representative configuration of the adsorption/desorption apparatus;

FIG. 10 is a cross-sectional view of an alternate construction for the sorption and regeneration apparatus;

FIG. 11 is a cross-sectional view of heat exchange elements shown in FIG. 9;

FIGS. 16 to 19 are detail views showing another type of adsorber unit that may be utilized in the system of FIG. 14.

Figure 2:
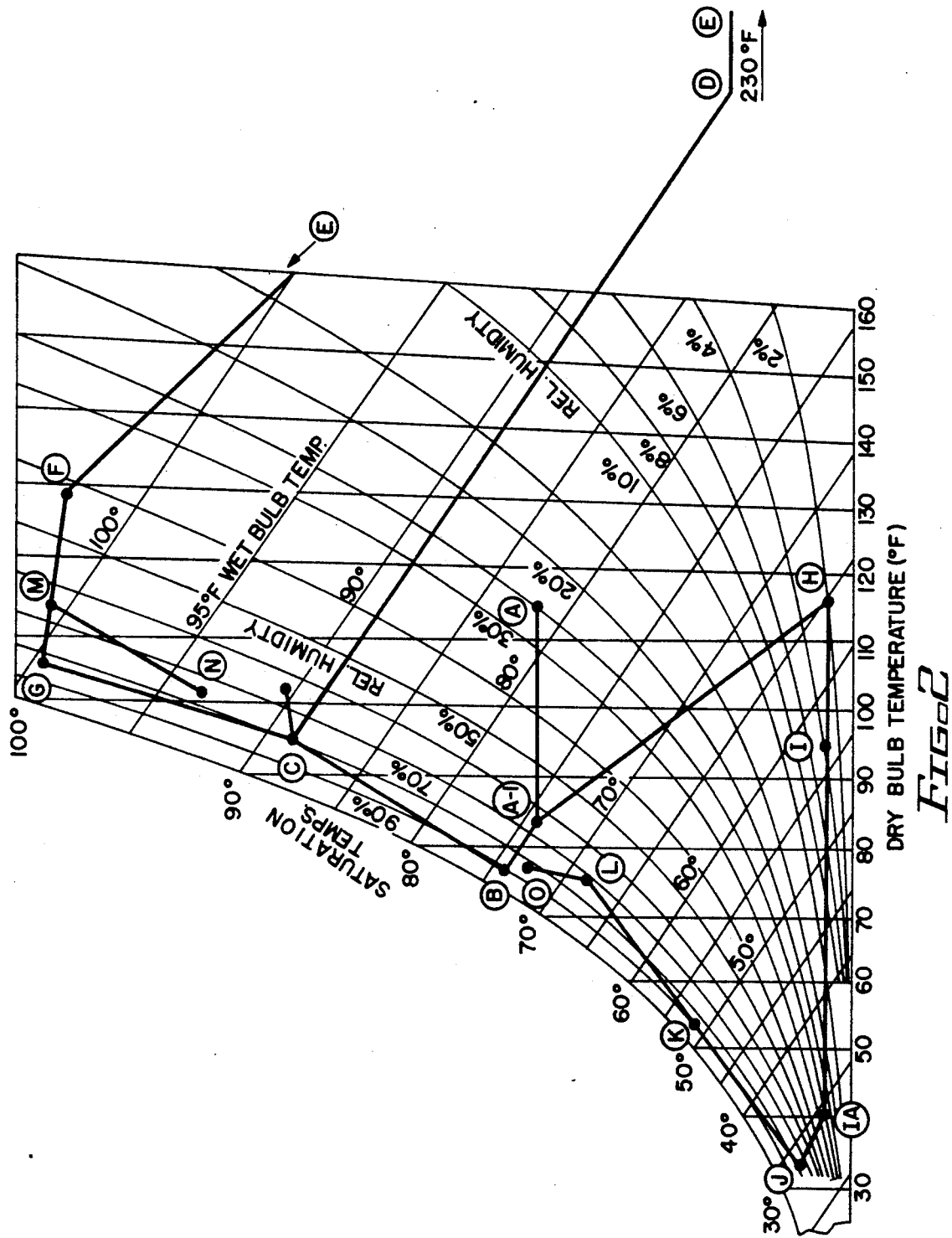
FIG. 2 is a psychrometric chart illustrating the stages of the process shown in FIG. 1.

Turning now to the drawings, particularly FIGS. 1, 2 and 7, a preferred form of the invention is shown generally designated by the numeral 10 having an initial stage heat exchanger 12 to achieve pre-cooling of the total air stream being processed. Heat exchanger 12 has a housing 11 and is divided by a longitudinally extending heat exchange element 16 into a primary chamber 18 and a secondary chamber 20. Housing 11 may be constructed of any suitable material and may be of any suitable shape such as rectilinear or cylindrical.

Heat exchanger 12 is shown in detail in FIG. 7 and includes a liquid absorbent surface 22 which is exposed to the secondary chamber 20. Surface 22 is hydrophobic and is porous. A nonporous, moisture-impervious barrier or film 24 extends substantially the entire length of the heat exchanger at the side of the element exposed to the primary treatment chamber 18. Preferably, the heat exchange element 24 is very thin having good heat transfer characteristics. Both the porous and nonporous materials may be a plastic such as PVC. Porous PVC material suitable for this purpose is available under the designation "Miplast" which is manufactured by the company UNGFER of Austria. The nonporous or impervious material may be a thin film of PVC laminated to the porous PVC or may be material such as a metal foil laminated to a porous PVC substrate. Preferably element 24 extends substantially the entire length of the heat exchanger 12 terminating a short distance from the outlet of chamber 18 leaving an area or zone 25 in which the porous material 22 is exposed to the primary heat exchange chamber 18. The total air flow, which typically is ambient air, is introduced into the primary chamber 18 under the influence of an air mover or fan 28. Ambient air is indicated at Point A in FIGS. 1 and 2. The total air flow exits the heat exchanger at outlet 30 and a portion of the total flow is diverted at 21 and directed to the secondary chamber 20 in a direction countercurrent to the flow through the primary chamber establishing a secondary air flow. The remaining portion of the total flow is designated as the primary flow.

As the total air stream flows through primary chamber 18, it is cooled by convection as heat is extracted from the total air flow across the heat exchange element 16. Concurrently, the secondary air flow moving in the opposite direction through the secondary chamber 20 is exposed to the adsorbent surface 22 of the heat exchanger element causing the secondary air stream to be heated and humidified as liquid is evaporated into the secondary stream. Continuing to follow the path of the total air stream, the changing conditions through the primary heat exchanger chamber are indicated by lines A-A1 and A1-B on psychrometric chart FIG. 2. Note that the representations on the accompanying psychrometric charts assume ideal conditions and some variation in actual practice may be expected. Throughout the schematic drawings, the various conditions at various process locations are indicated by letters (i.e. A, B, etc.) and the corresponding points are similarly indicated on the respective accompanying psychrometric charts.

A portion of the primary chamber 18 preceding the outlet 30 is exposed to the porous or absorbent material at zone 25. Dry or sensible cooling occurs to point A1. Adiabatic cooling of the total air flow occurs from A1 to B due to the moisture present in zone 25. The adiabatic cooling zone 25 comprises only a relatively short portion of the entire length of the cooling chamber 18.

The primary air stream exiting the primary chamber, which represents a portion of the total air stream, is introduced into a sorption device 32 having a main sorption zone 34, a primary air cooling zone 34A, a secondary sorption zone 32A, and a regeneration zone 36. Heating and dehumidification of the primary air stream occurs in the sorption zone 34. Regenerative heat may be obtained by heating a portion of the secondary stream with auxiliary heat in the zone 36. Line B-H represents the change of conditions of the primary air stream as it passes through zone 34.

Before entering the sorption unit 32, the secondary air is divided at point 80 (See FIG. 1) into two flows 80A and 80B. Portion 80A of the secondary air is used to extract heat from the primary air in sorption zone 34. The secondary air 80A is heated and humidified in zone 34A. This process is indicated on a psychrometric chart by line C-G and will be explained in greater detail with respect to FIG. 9.

Portion 80B of the secondary air enters the sorption zone 32A where it is heated and dehumidified. This process is indicated on the psychrometric chart of FIG. 2 by line C-D. After the portion of the secondary air designated 80B exits sorption zone 32A it enters a heating zone 36 where it is heated by heater 36A which may be energized by a convenient source. The heated air then enters a desorption zone 39 where cooling and humidification of the primary air takes place. These processes are indicated on a psychrometric chart by lines D-E (heating) and E-F (desorption).

The details of a typical sorption device 32 are shown in FIG. 9 which has three adjacent air chambers defining zones 34, 39 and 32A. A belt 35 of adsorbent, flexible material is supported at opposite ends by rollers 37 at least one of which is a drive roller. The belt 35 moves continuously in direction as shown by the arrows in FIG. 9 through adjacent chambers 34, 36 and 32A. The primary stream of air (at conditions B on the psychrometric chart, FIG. 2) enters chamber 34 where the air contacts the dry part of the adsorbent moving belt which dries the air and also increases its temperature.

A heat exchanger 34A is installed in the first adsorption zone 34. The heat exchanger has a number of tubular heat transfer elements 38 as shown in FIG. 11. The heat transfer element 38 consists of a solid, thin tube internally coated with a porous PVC 48 or other similar material as shown in detail in FIG. 11. A cooling media is directed internally through heat exchanger element 38 which comprises the portion of the secondary air stream 80A which evaporates liquid from the wetted porous surface of the heat transfer elements 38 and extracts some heat from the primary air stream becoming moistened and heated in the process. Subsequently, the secondary air stream portion 80A exits heat exchanger 34A at conditions indicated as "G". The primary air exits zone 34 at conditions "H".

The adsorbent moisture-impregnated belt 35 moves from the primary sorption zone 34 into desorption zone 39. The secondary air stream portion 80B from the second adsorption chamber 32A also enters into desorption zone 39 and after being heated by the auxiliary heater 36A contacts the moisture-impregnated belt 35 and removes some of the adsorbed liquid from the belt. The secondary air stream exits the desorption zone at the conditions indicated by letter "F" on the psychrometric chart FIG. 2. The adsorbent moisture-impregnated belt exits the desorption chamber 39 and enters the second adsorption chamber 32A where it contacts the secondary air stream 80B which results in some further air drying and heating due to the adsorption process. The secondary air stream then exits second adsorption chamber 32A and enters desorption chamber 39 as has been previously described after first being heated and then contacted with belt 35.

The conditions of the secondary air stream entering and exiting the second adsorption chamber 32A are indicated respectively by letters "C" and "D" on the psychrometric chart.

Portion 80B of the secondary heated moist air from the heating or regeneration zone 36 is discharged as is indicated at point F and is combined at point 82 with the secondary flow 80A at the conditions indicated as point G from heat exchange chamber 34A of the sorption device 32.

Referring to FIG. 1, the heated dry primary air stream exiting zone 34 of sorption unit 32 is directed to intermediate heat exchanger 40. Cooling zone 42 is located at one side of heat exchange element 44 of heat exchanger 40. Heat exchanger 40 is generally constructed as has been described above with reference to unit 12 with the exception that heat exchanger 40 does not include an adiabatic cooling zone as provided in unit 12. The opposite side of heat exchanger element 44 has a liquid absorbent surface 45 which is exposed to heating chamber 46 located on the opposite side of the element 44. The primary air stream passes through the dry cooling zone 42 and heat is extracted from the air to cause heating and humidification of the secondary air flow in the adjacent heating zone 46. Line HI on the psychrometric chart FIG. 2 represents the passage of the primary air flow through the dry cooling zone 42. The air exiting the dry cooling zone 42 is then subjected to a final dry evaporative cooling in final heat exchanger unit 50.

Final heat exchanger unit 50 is divided by a longitudinally extending heat exchanger element 54 into dry cooling chamber 51 and opposed heating chamber 56. Heat exchanger element 54 has a moisture impervious, nonporous surface 58 which extends substantially the entire length of the unit leaving adiabatic zone 55 adjacent outlet 60. The opposite heat exchange surface comprises a porous or liquid absorbent material 59 as has been previously described which material is exposed to chamber 51 in zone 55 immediately preceding the outlet. The primary air exits the heat exchange unit at 60 and may be directed to a space to be conditions. Dry cooling occurs from I to IA. In zone 55 adiabatic cooling occurs as indicated by line IA-J which represents the change of conditions occurring through zone 55 of the evaporative cooling unit.

A predetermined volume of the primary air identified as secondary air portion 80C is discharged from the final heat exchanger and is redirected at point 62 through chamber 56 adjacent the absorbent side 59 of the heat exchange element counterflow to the flow through chamber 51. Humidification and heating of the secondary air portion 80C occurs in chamber 56 which is represented by line J-K on the psychrometric chart FIG. 2. Additional heating and humidification of portion 80C occurs in heating zone 46 of unit 40 and is represented by line KL on the psychrometric chart. The heated, humidified secondary air stream portion 80C is then directed to condenser unit 70. A heat exchange element 75 extends longitudinally dividing the condenser unit 70 into adjacent chambers 72 and 74. The hot, nearly saturated secondary air flow, portions 80A and 80B from the initial heat exchanger 12 and the sorbent unit 32 which have been combined at 82 are cooled in zone 74 of condenser unit 70. This process is shown by line M-N. The process is also effective to produce a pure liquid condensate which is removed at 78.

Figure 4:
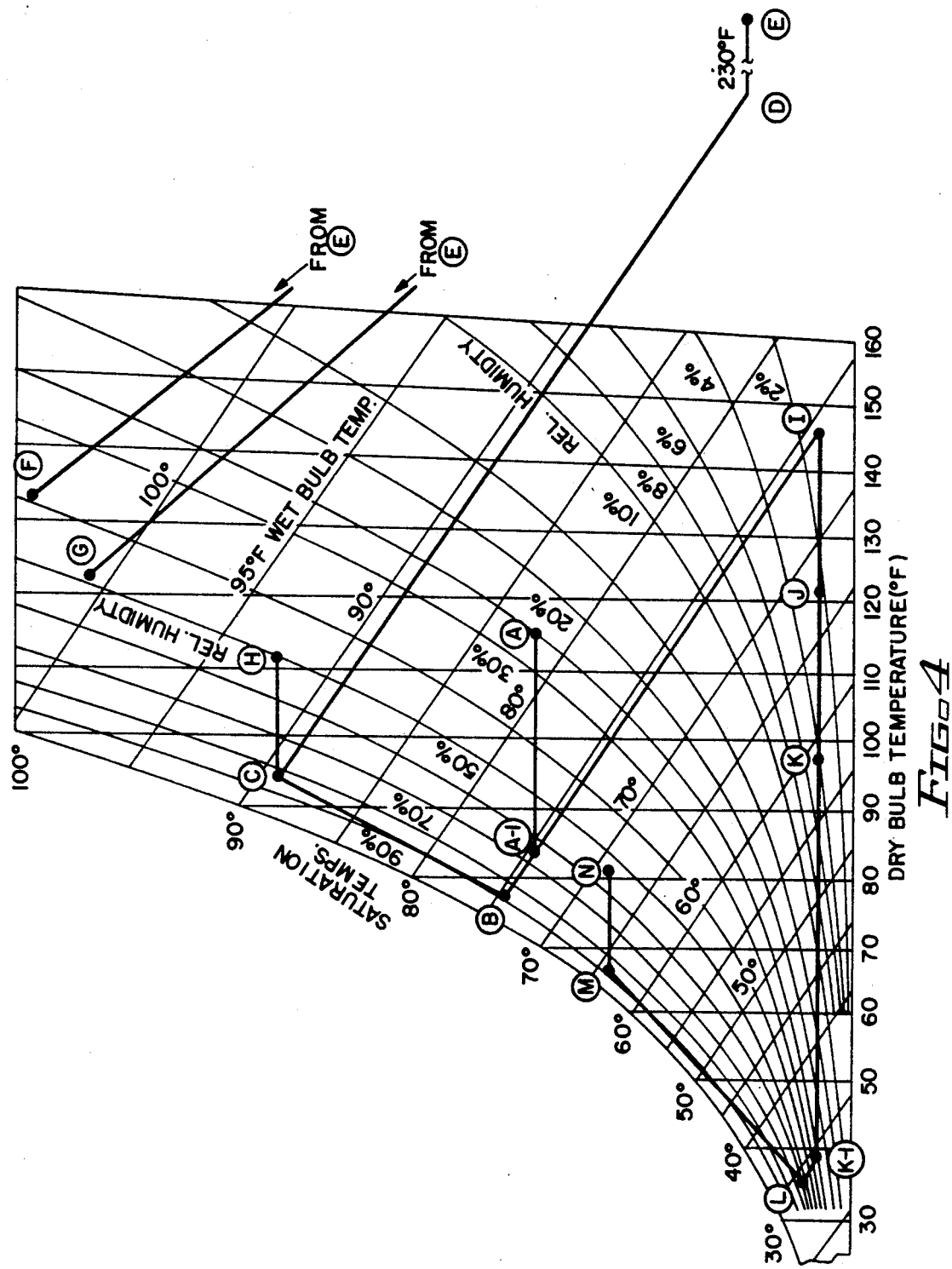
FIG. 4 is a psychrometric chart illustrating the process carried out by the system of FIG. 3.

FIGS. 3 and 4 illustrate an alternate embodiment of the present invention. The modification of the process shown with reference to these figures has the advantage of being simpler in construction although comparatively lower efficiency or performance may be exhibited as compared to that shown in FIGS. 1 and 2. Unlike the basic process described above with reference to FIGS. 1 and 2, the entire primary air main stream is subjected to a sorption process and the entire secondary stream utilizes the main stream for cooling which may take place either in an absorber or in an auxiliary heat exchanger. With the process of this embodiment, available regeneration heat is slightly higher. The utilization of a single absorber results in simplification of the design of the system.

With the system as shown in FIGS. 3 and 4, the total air flow is introduced into the inlet 101 of initial heat exchange unit 100 under influence of air mover 104 which creates a positive air flow in the system. It is to be noted that one of the advantages available with all embodiments of the present invention is that only a single air mover is necessary and the system does not require expensive or complex compressors or the like. Air moving through dry cooling chamber 106 of heat exchanger 100 undergoes an initial dry pre-cooling. The initial heat exchanger 100 is constructed generally as has been described with reference to unit 12 of FIG. 1 having a housing 103 having a longitudinally extending heat exchange element 110 with a moisture-impervious surface 108 extending substantially the length of chamber 106. The opposite surface 113 of the element 110 consists of a liquid absorbent material exposed to chamber 114. Surface 108 extends substantially the entire length of the heat exchanger chamber 106 terminating a short distance from the outlet 112 exposing the absorbent material 108 to the end of chamber 106 at adiabatic cooling zone 115. As the air moves through chamber 106 it is subjected to dry cooling along surface 108 and adiabatic cooling at zone 115. Points A, A1 and B of FIGS. 3 and 4 represent the conditions at the inlet, zone 115 and outlet, respectively.

At the outlet of the initial heat exchanger, a portion of the total air flow is diverted into a main stream and a secondary stream at point 116. The secondary stream is directed through chamber 114 in a direction counterflow to the primary flow to extract heat from the primary air stream in chamber 106 as moisture bearing the heat is evaporated into the secondary stream. After passage through the initial heat exchange unit 100, the secondary stream is split at point 125 into two streams 125A and 125B.

The primary flow exiting the initial heat exchanger is directed to sorption device 117 where heating and drying of the primary air flow occurs in sorption chamber 117A. Dry, hot secondary air is introduced into the adjacent chamber 118 of the sorption device 117 from a source such as heater 119 to indirectly cool the primary air by passing through or across a heat exchanger element as seen in FIG. 11. In sorption zone 117A, the main air stream is heated and substantially reduced in moisture content. This is represented by line BI on the psychrometric chart FIG. 4.

Secondary air stream 125A flows through adsorption zone 116A which is equivalent to zone 32A described above. Airflow 125A is heated by heater 119 and directed to either desorption zones 118 and 118A where regeneration of a moisture-removing media occurs. Zones 118 and 118A are the functional equivalent to zone 39 described with reference to FIG. 9. The zones 117A, 118, 116A and 118A may be of various construction and reference is made to FIG. 9 for a representative construction.

The primary air exiting sorption zone 117A is subjected to intermediate cooling in heat exchange units 130 and 132. Heat exchange units 130 and 132 are similar and each is constructed similar to the initial heat exchanger each having a longitudinally extending liquid impervious heat surface 135, 135A, respectively, as has been described before. An absorbent surface 136 is exposed to chamber 138 in heat exchanger 130. Similarly, the absorbent surface 136A is exposed to chamber 138A in heat exchanger 132. Thus, heat is extracted from the primary air stream flowing through dry cooling chambers 140 and 140A. The counterflow stream of secondary air through chambers 138 and 138A is heated and humidified as moisture is evaporated into the secondary stream. The impervious heat exchange surfaces 135, 135A each extend the entire length of their respective units so dry cooling occurs throughout the cooling chambers of the units.

Lines I-J and J-K on the psychrometric chart of FIG. 4 represent the change of conditions of the primary stream occurring in the intermediate heat exchangers and the secondary streams are represented at lines CH and JK.

Final stage of dry cooling of the primary air stream takes place in the final heat exchanger 150. The final heat exchanger 150 is constructed similar to the initial heat exchanger having a housing containing a longitudinally extending heat exchange element having a liquid impervious surface 154 and an opposite absorbent surface 156. The element divides the chamber into cooling chamber 160 and opposite heating and humidification zone 158. Preferably, the surface 154 terminates within chamber 158 exposing a portion of the dry cooling chamber 158 to the absorbent material for humidification at zone 155 in the chamber.

The primary flow is directed through dry cooling chamber 160 where heat is extracted across the heat exchange element 152. A portion of the primary air stream discharged from the cooling zone 160, defined as secondary stream portion 125C, is re-directed through the humidification and heating chamber 158 to extract heat from the primary air flow. The heated air exiting the humidification and heating chamber 158 is directed to chamber 138A of intermediate heat exchanger 132.

The treatment of the main stream in cooling zones 160 is represented by lines K-K1 and K1-L on the psychrometric chart of FIG. 4. The condition of the counterflow secondary stream 125C is represented by LM through zone 158 and MN through zone 138A. In the embodiment described above, some continuous supply of make-up water may be required which generally will be added to the wet chambers of 114, 138A, 158 and 138 of the respective heat exchanger units.

Figure 6:
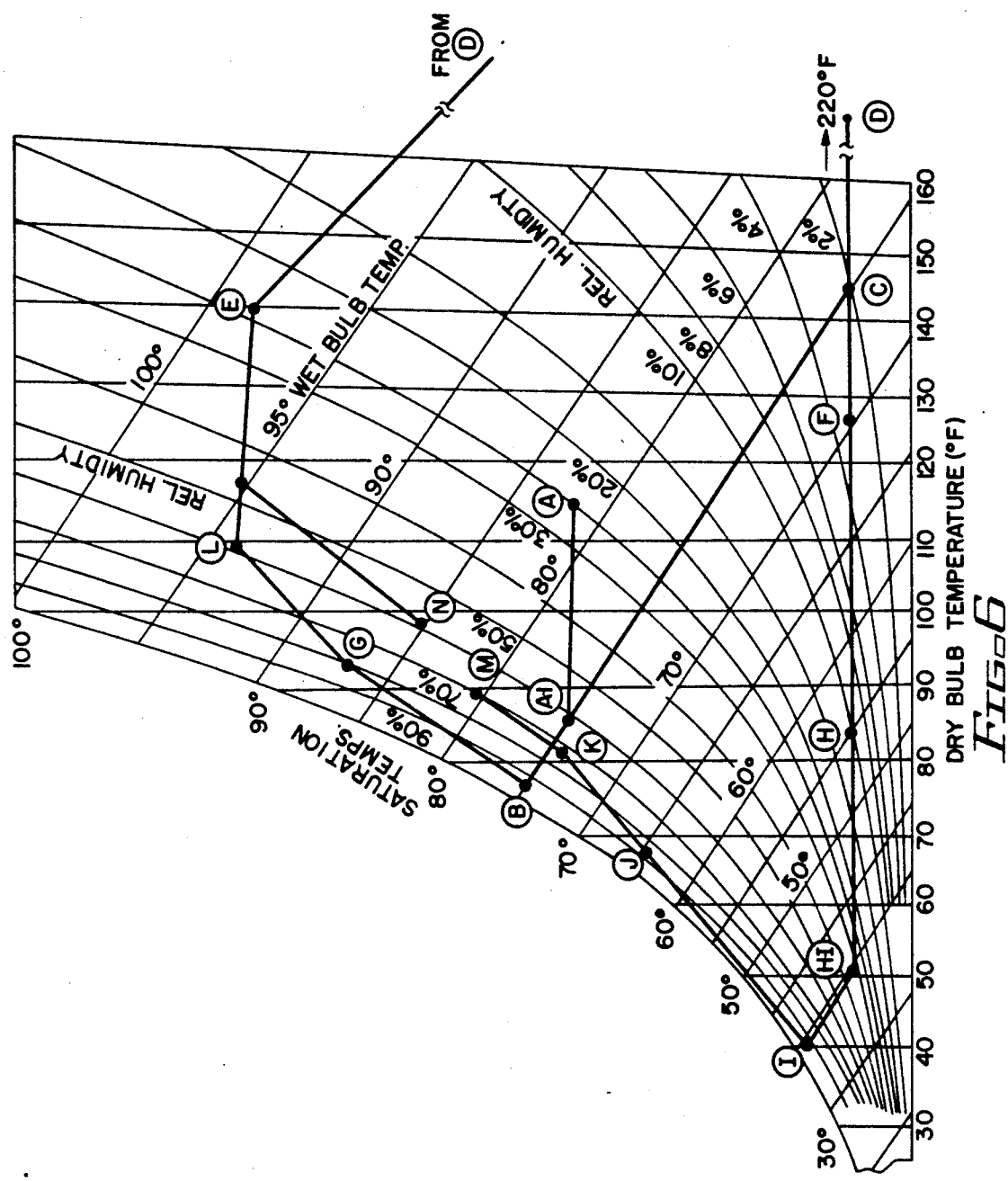
FIG. 6 is a psychrometric chart illustrating the process carried out by the system of FIG. 5.

Still another embodiment of the present invention is shown in schematic form in FIG. 5 and the process carried out therein is represented on the associated psychrometric chart FIG. 6. In the process of this embodiment the entire primary gas stream is subjected to a sorption process and the entire secondary stream is utilized for cooling and main stream which takes place in heat exchangers 230 and 232. With this variation, the amount of regenerative heat available is slightly greater and the system may either be an open or closed loop system.

Turning now to a consideration of FIGS. 5 and 6, the system shown minimizes the amount of equipment required. Some outside heat will be required for regeneration in the system of this embodiment. A total air stream typically at a temperature of 115° F. and having a relative humidity of approximately 25% is introduced into the initial heat exchanger unit 200 by air mover unit 201. Heat exchanger 200 is divided by a heat exchange element 202 as described above into adjacent chambers 204 and 206. The total air flow is pre-cooled in chamber 206 as it flows along the moisture-impervious side of element 202. A portion of the total stream is split off at 215 as a secondary air stream which is countercurrently directed through chamber 204 at the opposite side of the heat exchange barrier along the absorbent surface 205 of the heat exchange element. An adiabatic cooling zone 212 is established adjacent the discharge end of the heat exchanger. The total stream treatment through the heat exchanger 200 is represented bylines A-A1 and A1-B on the psychrometric chart of FIG. 6.

The stream of primary air continues to flow through the sorption zone 210A of the sorption unit 210. In the sorption zone the primary air is heated and dried as indicated by line BC on the psychrometric chart, FIG. 6. The sorption unit 210 is as described above having an adjacent regeneration zone 214 which receives heated air from heater 220. After treatment in the sorption unit 210, the primary air stream splits at point 250 into two portions 250A and 250B. The sorption unit may be of various configurations and as an example may comprise an endless belt of flexible, absorbent media moveable between the zones 210A and 214 as has been described with reference to FIG. 9.

The primary air stream portion 250A is then directed through intermediate dry cooling units 230 and 232 where dry cooling occurs. These units each have a heat exchange element 235, 235A with a moisture-impervious surface 236, 236A and an opposite absorbent surface 238, 238A on the opposite side, respectively. The heat exchange elements define dry cooling zones 234, 234A and heating and humidification zones 236, 236A, respectively.

Portion 250B of the primary flow is directed to auxiliary heating unit 220 which generates heat using any convenient energy source. The heated primary air portion 250B exiting heater 220 is directed to regeneration zone 214. See lines CD and DE of FIG. 6. The air exiting the regeneration section 214 of the sorption unit 210 is combined with the entire secondary flow from chamber 204 of the initial heat exchanger and is directed to condenser chamber 260 of condenser unit 262.

Final cooling or sensible cooling of the primary air flow occurs in final heat exchanger unit 270 which again has a dry cooling chamber 272 and a heating and humidification chamber 274 established by element 278 which is constructed having a moisture impervious element and an opposite porous element. Adiabatic cooling zone 275 is located adjacent the discharge from chamber 272. A portion of the primary flow exiting the final cooling stage is directed counterflow through chamber 274 where it is heated and humidified and is directed through chamber 236A of intermediate heat exchanger 232. The air flow is then directed to the chamber 264 of condenser unit 262. The various treatment stages are represented on the psychrometric chart and the flow chart by letters.

The following is a summary of typical conditions that will occur at the various stages in the above three embodiments or options. In each case, starting conditions are assumed to be ambient air at approximately 115° F. and 25% relative humidity.

REPRESENTATIVE PROCESS CONDITIONS

Main Stream Flow

| FIG. 1 | | |
| --- | --- | --- |
| Point on Psychrometric Chart | Temperature | Relative Humidity |
| Ambient @ Inlet (A) | 115° F. | 25% |
| Exit 1st H.E. (B) | 77° F. | 90% |
| Exit Sorption Zone (H) | 117° F. | 2% |
| Exit Dry Cool Zone (I) | 95° F. | 4% |
| Final Treated Air (J) | 35° F. | 35% |

| FIG. 3 | | |
| --- | --- | --- |
| Point on Psychrometric Chart | Temperature | Relative Humidity |
| Ambient @ Inlet (A) | 115° F. | 25% |
| Exit Initial H.E. (B) | 77° F. | 90% |
| Exit Sorption Zone (I) | 145° F. | 1% |
| Exit 1st Intermediate H.E. (J) | 122° F. | 2% |
| Exit 2nd Intermediate H.E. (K) | 97° F. | 4% |
| Final Treated Air (L) | 33° F. | 55% |

| FIG. 5 | | |
| --- | --- | --- |
| Point on Psychrometric Chart | Temperature | Relative Humidity |
| Ambient @ Inlet (A) | 115° F. | 25% |
| Exit Initial H.E. (B) | 77° F. | 90% |
| Exit Sorption Zone (C) | 145° F. | 2% |
| Exit 1st Intermediate H.E. (F) | 125° F. | 3% |
| Exit 2nd Intermediate H.E. (H) | 85° F. | 10% |
| Final Treated Air (I) | 41° F. | 90% |

The construction of the initial and final heat exchanger have been described above and are essentially the same. Other constructions can be utilized in the overall system. FIG. 8 shows a variation in which the heat exchanger has an external housing 300 containing a pair of spaced-apart heat exchanger elements 310 and 312. The heat exchanger elements define a central passage 320 in which dry cooling occurs. The outer passages 324 and 326 receive the secondary stream which is heated and humidified due to the exposure to the wetted absorbent surface 230. The central dry cooling channel is defined by the moisture-impervious surfaces of the heat exchange elements. An adiabatic zone 330 exits adjacent the discharge end of the central channel.

An alternate arrangement for the sorbent unit is shown in FIG. 10. In the sorbent unit, the primary stream is dried and the secondary stream used for regeneration of the absorptive media. The sorbent unit of FIG. 10 is generally designated by the numeral 400 having a sorbent zone 402 and a regenerative zone 404. A rotor 405 is mounted on an axle 408 which is motorized. The rotor has solid plates 410 normally extending in opening 412 to separate the zones 402 and 404. Porous, absorbent elements 420 and 422 extend transversely into the zones from the axle. A heater 426 directs heat onto the element 422 in the regeneration zone.

The primary air will be dried as it passes across element 420 as the element 420 absorbs moisture from the air flow. When element 420 becomes saturated, the rotor 405 is activated to rotate element 420 into position in the regeneration zone. The now-saturated element 422 is dried in the regeneration zone by heater 426. The process continues as necessary with appropriate monitoring equipment measuring such parameters as temperature and humidity controlling the regenerative cycling of the adsorbent elements. The hot, wet stream is discharged at 445.

The various system variations are representative as are the process representations on the accompanying psychrometric charts. The initial ambient conditions will influence performance as will adjustments to air flow throughout.

Although the preferred form of the system utilizes an initial heat exchanger in which dry cooling of the total air occurs, in some environments this stage may be omitted. The outside air would then be first subjected to drying in a sorbent zone and finally cooling in a final heat exchanger of the type such as that designated by numeral 10 in FIG. 1. The regenerative stream from the drying media may be the counterflow secondary stream from the heat exchanger which is heated by an auxiliary heater. Alternatively, under some conditions, the ambient air input can be split with a portion used as the secondary flow through the sorption unit of the type shown in FIG. 9A.

Figure 12:
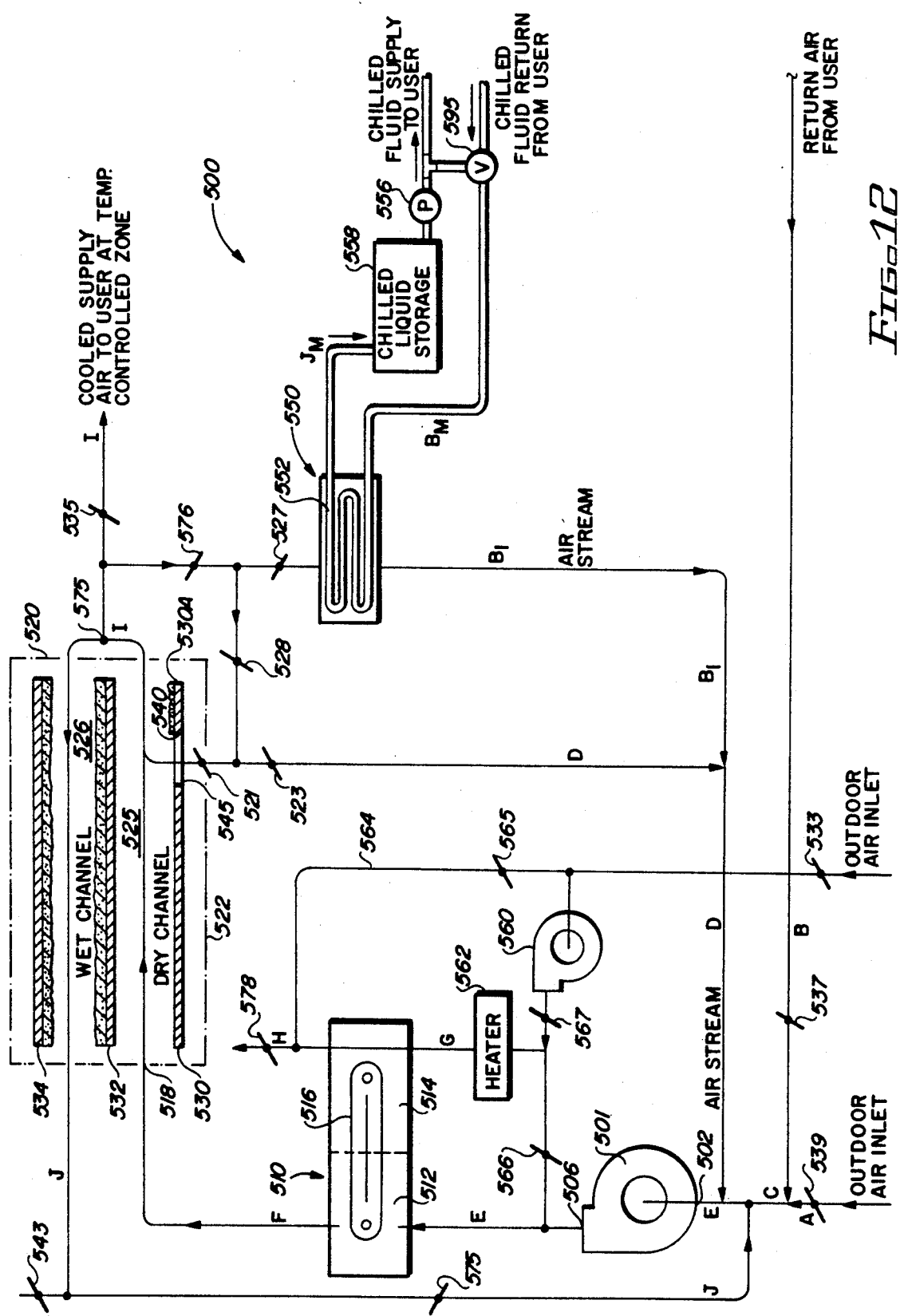
FIG. 12 is a schematic flow diagram illustrating another embodiment of the present invention.
Figure 13:
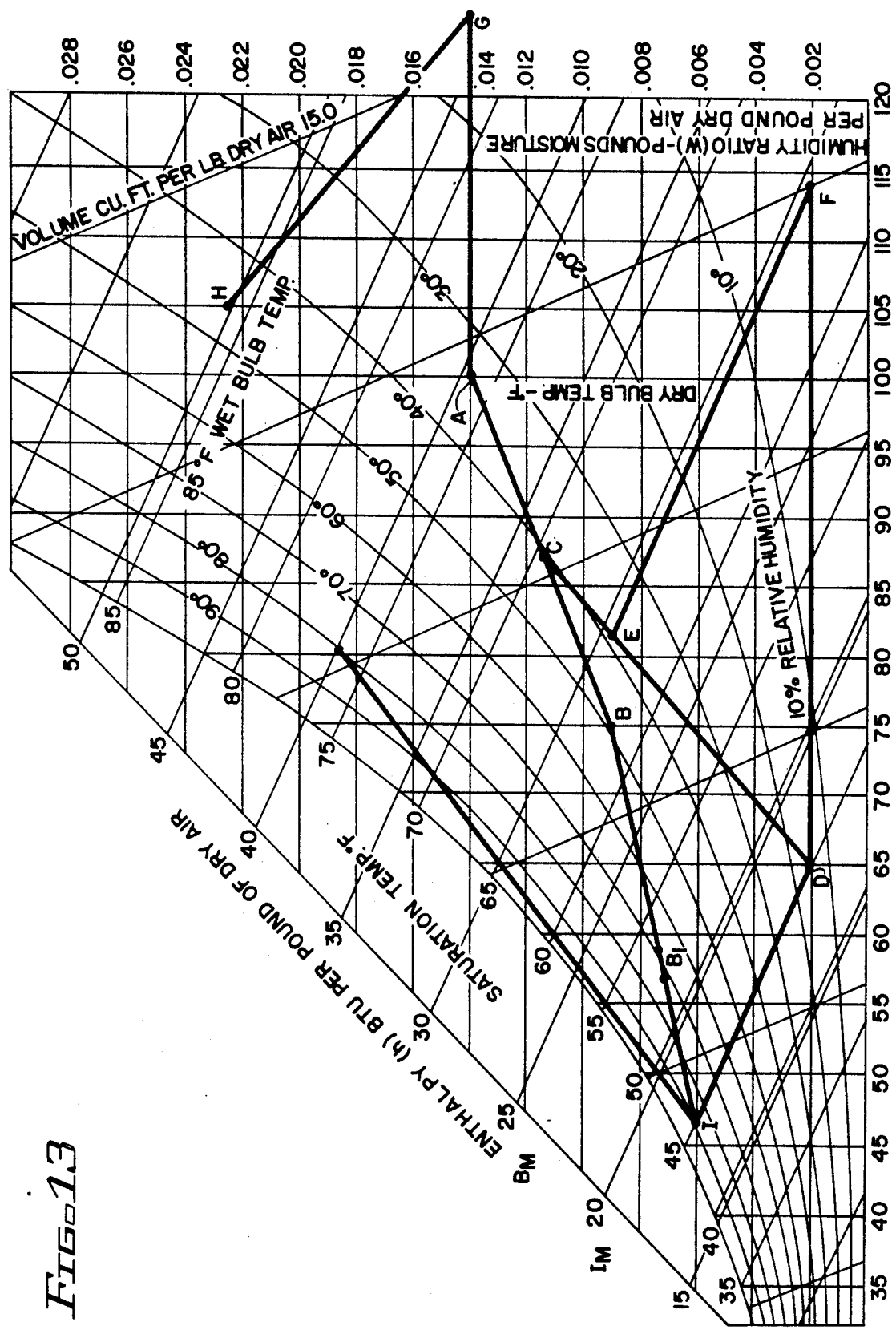
FIG. 13 is a psychrometric chart illustrating the process carried out by the system of FIG. 12.

FIGS. 12 and 13 show still another embodiment of the system of the present invention. The system shown in these figures serves to mix sensibly pre-cooled air, outdoor air and return air to improve the cooling and dehumidification process providing the user a choice of operating modes. The system operates at reduced energy levels and can be selectively operated to produce chilled water. FIG. 12 schematically illustrates the process and FIG. 13 is a representation of a psychrometric chart of the operating mode of the system. The various letters A, B, C, etc., on FIG. 12 represent the process location of the corresponding points of the chart of FIG. 13.

Referring to FIG. 12, the system is generally designated by the numeral 500. The system includes a main fan 501 having an inlet 502 and a discharge 506. The fan discharge 506 directs the total air flow to adsorber 510 which is divided into adsorption zone 512 and desorption or regeneration zone 514. The adsorber may be of the type as has been described with reference to FIGS. 9 and 10 and is shown having adsorbent media 516 which is moveable between zones 512 and 514. The adsorbent media may be part of a belt, wheel or any other structure of this type. The adsorbent media may be a silica gel, a molecular sieve, activated alumina or other media known to those in the art.

The discharge from the adsorption zone 512 is directed to the inlet 518 of primary heat exchanger 520. The heat exchanger is constructed generally as has been described above and has a housing 522 which is internally divided into one or more longitudinally extending dry channels 525 and one or more adjacent wet channels 526 by impermeable walls 530, 532 and 534. For convenience, the description is with reference to a primary heat exchanger 520 having a single wet and dry channel. The walls 532 and 534 disposed towards the wet channel 526 are coated with a porous, hygroscopic material 536, the material being of the type that has been previously described, for example in the form of an absorbent coating, film or similar layer.

Part of the dry sensibly cooled total air flowing through the dry channel may be returned to fan 501 at discharge 545 by opening dampers 521 and 523. The remaining air flow is split at 575 and the primary flow directed across damper 535 to the temperature controlled zone. A portion of the cooled air is returned countercurrently through the wet channel 526 and discharged to the exterior across damper 543. The sides of walls 530, 532 defining the dry channel are nonpermeable except for a relatively short distal section of wall 530A disposed adjacent the outlet of the heat exchanger in which section adiabatic cooling occurs. The interior side of wall section 530A disposed toward the dry channel is a porous, hygroscopic material 540. The material 540 creates a zone in which adiabatic cooling of the total air occurs. Discharge 545 is provided at the end of the dry channel so that the air discharged is dry, sensibly cooled.

A secondary heat exchanger 550 receives the primary air discharged from the dry channel 525. Heat exchanger 550 is a conventional gas-to-liquid heat exchanger. A plurality of coils 552 extend within the heat exchanger and serve to circulate liquid from liquid storage tank 558 through the coils 552 under the influence of circulating pump 556. A three-way valve 595 controls the admission of chilled fluid return from the user in accordance with the user's load.

The system is also equipped with an auxiliary fan 560 which has a discharge which directs air across heater 562 to the regeneration zone 514 of the adsorber 510. Air discharged from the regeneration or desorption zone 514 may be returned by means of return duct 564 to the inlet of auxiliary fan 560 controlled by damper 565. Shut-off dampers 566 and 567 are provided at the outlet of auxiliary fan 560.

The system shown and described with reference to FIG. 12 may be operated in several modes. In the basic mode of operation, mixed air is drawn into the inlet 502 of fan 501. The mixed air may consist of a mixture of ambient outdoor air across damper 539, return air from the climate-controlled zone across damper 537 and sensibly cooled air from the primary heat exchanger across the dampers 521 and 523. The precise air proportions can be regulated by the user by use of appropriate dampers 539, 537, 523, 521, 578, 543 and 533. Typically, the outdoor air will be at the conditions indicated by A on the psychrometric chart, return air is indicated by C on the psychrometric chart and conditioned air indicated by the conditions indicated at D on the psychrometric chart. The resulting air mixture introduced into the inlet 502 of the fan will be typically at condition E as indicated on the psychrometric chart. The fan discharges the air at 506 into the adsorption zone 512 where drying and heating of the air occurs with the resultant discharge from the adsorption zone 512 being at the conditions F as indicated on the psychrometric chart. The air is then introduced into the dry channel 525 of the primary heat exchanger where sensible cooling occurs. A portion of the air exits the heat exchanger at discharge 545 and the remaining portion of the total air flow which is termed the primary is adiabatically cooled in zone 530A.

There are various configurations of the adsorber 514 that may be utilized. As shown, the adsorbent media 516 moves continuously or intermittently between the adsorption and desorption zones. At predetermined periods, generally when the media is at or nearly saturated, regeneration occurs in the desorption zone 514 by means of outdoor air preheated to conditions A at a heater 562 and supplied by auxiliary fan 560.

The air entering the dry channel 525 of the primary heat exchanger 520 is at conditions indicated by F on the psychrometric chart and is subject to sensible cooling due to moisture evaporation which occurs in the adjacent wet channel 526. A detailed description of the cooling process has been previously explained. A portion of the sensibly cooled total air stream entering the dry channel is discharged from the dry channel at discharge 545 and directed across dampers to the inlet or suction side of main fan 501 where the discharged air is mixed with outdoor air and return air as has been explained. The air discharged at 545 is termed the intermediate cooled air. The remaining portion of the total air flow, passes through the zone 530A of channel 525. The air stream is subject to adiabatic cooling in this zone and exits the heat exchanger at conditions indicated by I on the psychrometric chart. The remaining total air stream exiting the dry channel is divided into two airstreams at 575. A portion of the air stream termed the secondary air stream is directed through the wet channel 526 countercurrently to the flow through channel 525 where the air is heated and humidified extracting heat from the total air stream counterflowing in the adjacent dry channel. The cooled portion of the primary air stream termed the cooled supply air stream is directed across damper 535 to a space or area to be cooled. The air flow exiting the wet channel at conditions J is discharged to the outside at damper 543. The return air volume and volume of make-up air are regulated at dampers 537 and 539.

In the basic mode of operation for cooling described above, control is achieved by dampers and valves in the system. Dampers 535, 539, 537, 521, 523, 543 and 567 are open. Dampers 566, 575, 576 and 528 are closed. Dampers 533, 565 and 578 are selectively positioned at an intermediate or partially opened position. Pump 556 is in an "off" position. Fans 501 and 560 are operational.

The system shown in FIGS. 12 and 13 may also be operated in a chilled water-generating mode. In this mode, the cooling unit is used as a chilled water generator. In order to convert the cooling unit from the basic mode described above to the chilled water-generating mode, dampers 535 and 537 are closed. Dampers 576 and 527 are opened and circulating pump 556 is turned on. Three-way diverting valve 595 is operated in accordance with the user's cooling load. In this mode of operation, the cooled air supply exiting heat exchanger 520 is diverted and flows across the coils 552 of liquid-to-gas heat exchanger 550. Chilled fluid return from the user is directed across the three-way valve 595 through the coils 552 of the heat exchanger where it is cooled in the heat exchanger. Some of the chilled fluid supply may be mixed with the return flow. The conditions of the air entering and leaving the heat exchanger 550 are indicated on the psychrometric chart at I and $B_1$, respectively. Thereafter, the air is returned under the influence of fan 501 to the adsorber 510 and then to the primary heat exchanger 520. Tank 558 stores chilled liquid for use.

The cooling system shown in FIGS. 12 and 13 may be converted from a basic mode of operation into an operational mode with 100% recirculating air. To accomplish this, dampers 543 and 539 are closed and damper 575 is opened. In this case, secondary air at condition J is not exhausted to the outside but is instead directed to the suction side of the main fan 501 where it is mixed with return air at conditions B.

With the foregoing system it is also possible to supply air for regeneration to the desorption zone 514 without the necessity of operating the auxiliary fan 560. In this case, dampers 567 and 565 are closed and damper 566 is open and regeneration air is supplied by the main fan 501.

If the user requires cooler and drier air than is normally required, this can be accomplished by means of opening dampers 576 and 528 with the cooling system operating otherwise as described above with respect to the basic mode of operation. All other dampers remain in their positions as described with reference to the basic operation mode.

Thus, the system of FIGS. 12 and 13 is very versatile, operable in several modes depending on the user's requirements for cooling, need for chilled water, and the type of energy source available.

Figure 14:
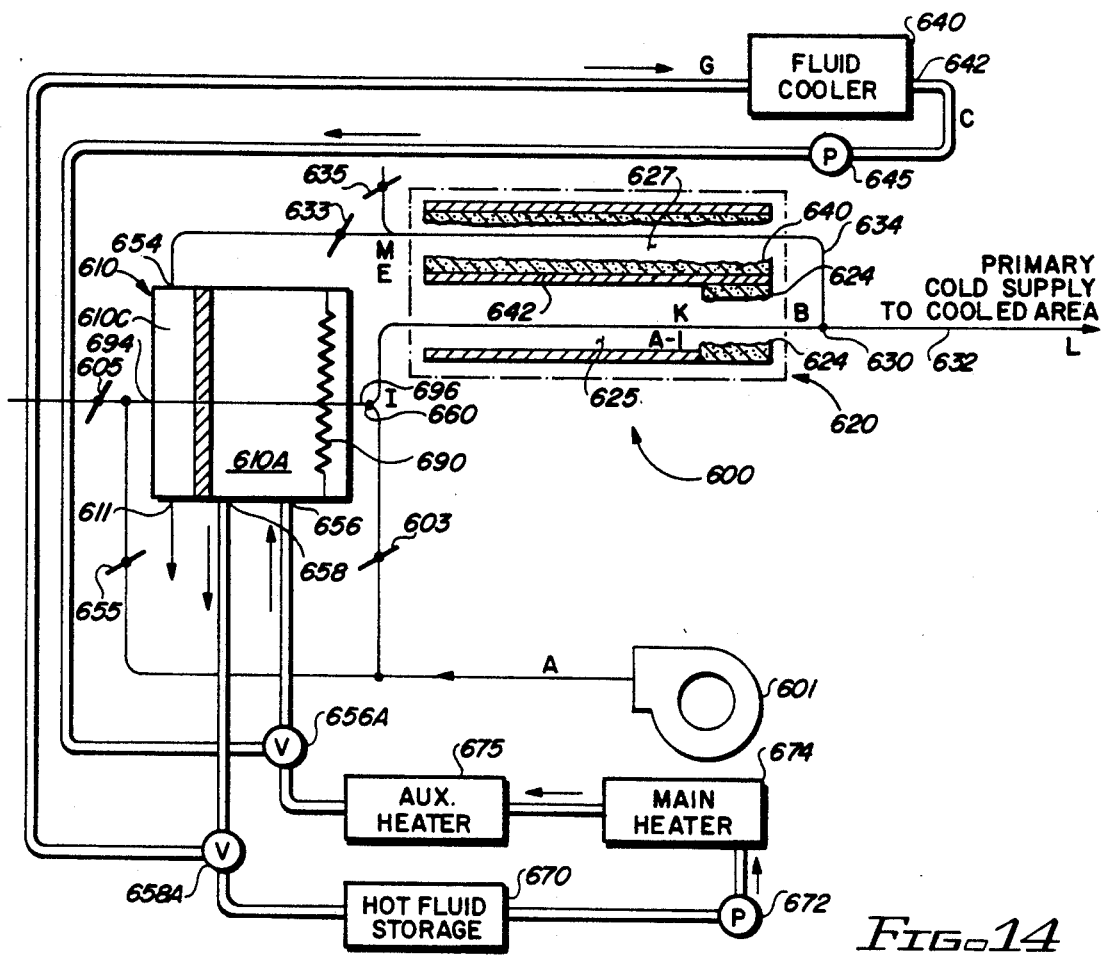
FIG. 14 is a schematic flow diagram of still another embodiment of the present invention.

FIGS. 14 to 20 illustrate still another embodiment of the present invention. Referring to FIG. 14, a schematic diagram of a air cooling system is shown which provides variable temperature continual cooling with intermittent adsorption and regeneration. Again, as with reference to previous system embodiments, the term "air" is used for convenience to indicate various types of two-atom gases that may be treated and cooled. With the system shown in these figures, slightly higher supply air temperatures to the cooled zone might be experienced during regeneration. However, this should not be a particular problem under most operating conditions as studies have shown that occupants are generally more comfortable if some slight temperature differential occurs in the temperature controlled zone or environment.

Figure 20:
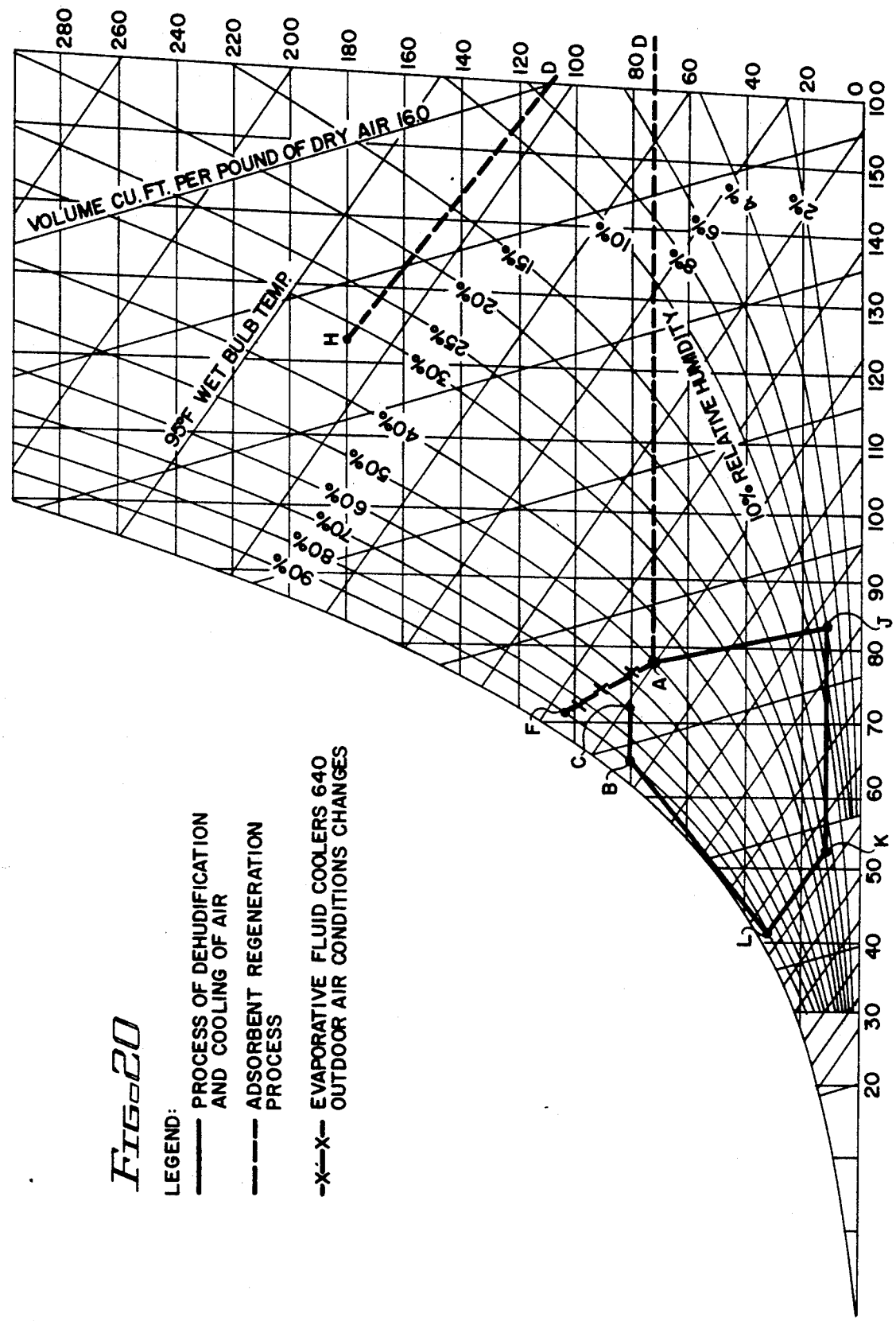
FIG. 20 is a psychrometric chart illustrating the process carried out by the system of FIG. 14.

The system is designated by the numeral 600 and operates to treat a total air stream at initial conditions A on the accompanying psychrometric chart FIG. 20. Air is introduced into an adsorber 610 by means of fan 601. In this mode, dampers 603 and 605 are closed and damper 655 is open. As the air moves through the adsorber, its moisture content is lowered while simultaneous cooling occurs. The total air stream exits the adsorber at conditions I and is then introduced into the dry channel 625 of the primary heat exchanger 620. Again, the wet and dry channels are shown but as has been described multiple channels as shown in FIG. 8 may be employed. In the dry channel, the total air is subject to sensible cooling to condition K with adiabatic cooling occurring at the end of the dry channel in zone 624 due to wetted, porous media present. The primary heat exchanger is constructed as has been described, as for example, with reference to previous FIGS. 1 and 3.

The total air stream splits downstream of the primary heat exchanger at 630 into two air streams, the cooled supply stream 632 and the secondary stream 634. The cooled supply stream 632 is directed to a conditioned space or zone while the secondary stream is directed to the wet channel 627 of the heat exchanger 620. The secondary stream 634 flows countercurrently to the total air flow in channel 625 and is humidified due to the evaporation water from the wet surface 640 of channel 627. Heating also occurs due to the absorption of heat rejected (or extracted) from the total stream of air flowing through the dry channel 625. The barrier 642 is moisture impervious and the surface 640 is a porous, absorbent media as previously described. The secondary air stream exits the wet channel 627 at conditions corresponding to point M on the psychrometric chart, FIG. 20. Thereafter, the secondary stream is directed into the cooling chamber 610C of adsorber 610 at inlet 654 where the stream assimilates a part of the adsorption heat. The airstream is discharged from the adsorber to the outside at 611. In this mode of operation, damper 635 is closed and damper 633 is open.

For more effective cooling of the total air stream in the adsorber, a conventional indirect evaporative fluid cooler 640 may also be provided which serves as a cooled fluid generator in heat exchange relationship with adsorber 610. Cooler 640 may be a conventional design surface evaporative heat exchanger in which fluid is cooled due to the evaporative effect. Pump 645 draws cooling fluid from the cooler 640 at discharge 642 at initial conditions C and enters the heating/cooling chamber 610A of the adsorber 610 at 656 where it is heated to condition G due to assimilation of all or part of the adsorption heat. The cooling fluid is then returned to the cooler 640 via adsorber discharge 658. The three way valves 656A and 658A are open to cooling fluid and closed to heating fluid in the cooling mode of operation. This cycle continues until the adsorbent reaches a predetermined degree of saturation and thereafter the system is switched to the regeneration mode. Section 610C is referred to as the cooling section since cooling occurs in the heat exchanger in this chamber. Section 610A is referred to as the heating/cooling section as both occur in the heat exchanger in this chamber depending on the operational mode.

In the regeneration mode, dampers 603 and 605 are open and damper 655 is closed. The valves 656A and 658A are then opened to direct heating fluid to chamber 610A and the supply of cooling fluid from fluid cooler 640 is terminated. The total air stream at conditions A supplied by fan 601 is split at 660 into two streams. One stream is the regeneration stream which is directed into the adsorber's heating/cooling section 610A and the other portion, designated the main stream, enters the dry channel 625 of the heat exchanger 620 where it is sensibly cooled to conditions A-1 and thereafter adiabatically cooled in zone 624 of the dry channel to conditions B. The main air stream at condition B is split at point 630 into two portions, a supply stream 632 and a secondary stream 634. The cooled supply stream is directed to the area or zone which is temperature controlled. The secondary stream enters wet channel 627 of the heat exchanger 620 where the stream is heated and humidified to the conditions E due to extraction of heat from the total stream of air moving countercurrently in the adjacent dry channel 625. The secondary stream is discharged to the outside. In this mode of operation, damper 633 is closed and damper 635 is open. This cycle of operation continues until the adsorbent in adsorber 610 is dried to a predetermined, acceptable level of saturation and the regeneration mode is completed.

Regeneration of the adsorber 610 requires heat. Various available sources of energy for regeneration of the adsorbent may be utilized including such sources as solar energy, natural gas, propane, waste heat and electricity and the like. The choice of energy source depends on local energy availability and economic considerations. A heated heat transfer fluid is stored in tank 670 and by means of pump 672 is directed through the main heater 674 and auxiliary heater 675 into the heating chamber 610A of the adsorber where the heat is used to remove moisture from the adsorbent. After regeneration is completed, the adsorbent in section 610C is cooled by the secondary air stream from the primary heat exchanger 620 which enters the adsorber at parameters E and by cooling fluid from fluid cooler 640 which cools the adsorbent in section 610A. Once the regeneration cycle is completed, the air cooling mode of operation may again be initiated.

It is possible that the system may be provided with a second adsorber arranged in parallel relationship with the first adsorber in which case the air cooling system is able to provide continual cooling. In this case, one adsorber will operate in the cooling dehumidification cycle while the other one is in the regeneration cycle. When regeneration is complete and the adsorbent dries to a predetermined degree of saturation, the main air flow is then directed to the regenerated adsorbent unit and the saturated unit would be switched to the regeneration mode of operation. The details of the adsorber construction follow.

Figure 15:
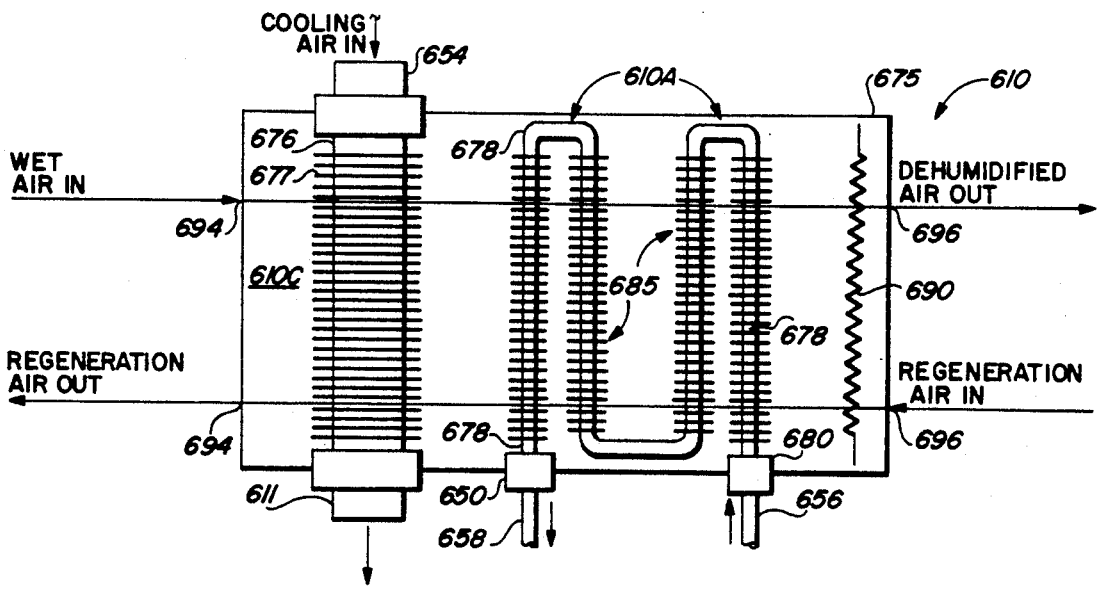
FIG. 15 is a cross sectional view of one type of adsorber unit that may be utilized in the system of FIG. 14.

Adsorber 610 may be of various construction and FIG. 15 shows a typical construction. The adsorber 610 is a mass heat transfer device having a housing 675 constructed of a suitable material having a low heat conductivity and low specific heat. As shown in FIG. 15, the design may be a multi-tube type heat exchanger. The heat exchanger includes a first section 610C which is the cooling section having one or more tubular heat exchange members 676 extending transversely through the housing. The heat exchange member 676 is shown as a tube having external fins 677 thereon coated with an adsorbent, desiccant material such as silica gel. The member 676 has an inlet 654 and an outlet 611 and in the normal cooling mode inlet 654 is connected to receive a supply of air exiting the wet channel 627 as has been described.

A second group of heat exchange tubes 678 are located immediately adjacent tubes 676 and serve as auxiliary heating/cooling channels in heating/cooling chamber 610A. One end of heat exchange tubes 678 are connected to inlet manifold 680. The opposite end of the tubes 678 are connected to outlet manifold 650. Manifolds 650 and 680 have inlet and outlet connections 656 and 658 for selective connection to a source of heating or cooling fluid. The manifold 650, 680 and tubes 678 establish the cooling/heating section 610A within the adsorber.

Heat exchanger tubes 678 are finned and externally coated at 685 with a suitable adsorbent material such as silica gel. Depending on the selected cycle of operation (dehumidification/adsorption or regeneration/desorption) a cooling or heating fluid is introduced into the heat transfer tubes 678. An auxiliary heating element 690 such as an electric heater extends transversely within the chamber 610A of the adsorber 610 to heat reversely flowing air during regeneration.

It will be seen that in the cooling mode, the total flow of moist, ambient air from fan 601 is introduced into the adsorber 610 at inlet 694 and is first subject to dehumidification and cooling as it passes through section 610C across heat transfer elements 676. Further cooling and dehumidification occurs as the air passes through or across heat exchanger elements 678 in section 610A. Thus, the dehumidified air moving through the adsorber undergoes a two-stage cooling process indirectly exchanging heat with secondary air from wet channel 627 and cooling fluid from fluid cooler 640. The dehumidified and pre-cooled total air stream exits at 696 and is directed to the main heat exchanger 620 for further cooling in the manner described above.

In the adsorbent regeneration cycle, a low volume of regeneration air is reversely directed through the adsorber 610 and is introduced at 696 and exits at 694. The principal regeneration heat is supplied by the fluid heating system during which time the cooling fluid supply to the adsorber is terminated. The heating fluid enters and exits manifold 650, 680 via connections 656 and 658. The auxiliary heater 690 preheats the regeneration air and the dual heated air dries the adsorbent coating on heat exchanger tubes and fins 676, 678, 677 and 685. After the adsorbent is regenerated, it is necessary to cool the adsorber down.

In addition to the tube-type adsorber described above, various other designs may be used. FIGS. 16 to 19 show an adsorber construction designated by the numeral 700 in which tubes are replaced with spaced-apart parallel moisture-impervious plates 702 within the housing of the adsorber. The plates define a plurality of air passageways 704 having internally coated adsorbent surfaces 705. Interposed between the air passageways 704 are parallel heat exchanger passages 706A and 706B. The passages 706 have an intermediate barrier 716 forming heat exchanger section 710C at the inlet end 730 and section 710A at the outlet of the adsorber 710. Section 710C is the cooling section and section 710A is the heating/cooling section. The auxiliary heater 725 is located at the outlet end of the heat exchanger in section 710A. The total air stream in the cooling mode passes through the inlet 730 of the adsorber through the passageways 704 and is discharged at the outlet 732 undergoing dehumidification and two-stage cooling. During the cooling process, cooling fluid from the fluid cooler is introduced into the passages 706B of section 710A at manifold 738. The cooling fluid exits at 735. Similarly, secondary air exiting the wet channel is introduced into manifold 736 and passages 706A of the adsorber section 710C to cool the total air stream passing through the unit. The secondary cooling air exits at 740.

In the regeneration stage, heated fluid from heat storage tank is pumped through adsorber section 710A entering and exiting at manifold 738 and 735 and circulating through passages 706B and at the same time heated air for regeneration is introduced into the air flow passages 704 at 732. The regeneration air is also heated by the auxiliary heater 725 and serves to dry out the adsorbent material 705 in passages 704. When regeneration is complete, the unit is ready to be placed in cooling service.

It will be obvious to those skilled in the art to make various changes, alterations and modifications to the method and apparatus for gas cooling described herein. To the extent such changes, alterations and modifications do not depart from the spirit and scope of the appended claims, they are intended to be encompassed therein.

I claim:

1. A cooling system for cooling a gas and supplying it to an environmentally cooled zone, said system comprising:
    (a) a primary heat exchanger having a dry cooling channel and an adjacent humidification and heating wet channel;
    (b) a gas mover having an inlet connected to a source of gas to be treated and a discharge communicating with said dry cooling channel directing a total gas flow to said dry cooling channel;
    (c) means for directing a portion of the total gas flow exiting the dry cooling channel countercurrently through said adjacent humidification and heating wet channel to a secondary air stream to heat and humidify the secondary air stream and to simultaneously establish a separate primary cooled supply gas flow;
    (d) adsorber means having adsorptive media associated therewith and communicating with said dry channel to receive said primary cooled supply gas flow; and
    (e) means for selectively regenerating said adsorber means.

2. The system of claim 1 wherein said gas is air and said gas mover selectively communicates with air from one or more of the following sources: ambient air, return air and air discharged from the dry cooling channel.

3. The system of claim 1 wherein said means for regenerating said adsorber means comprises auxiliary gas mover means for directing a regenerative gas flow to said adsorber means.

4. The system of claim 3 further including heater means for heating said regenerative gas flow.

5. The system of claim 4 including control means for directing at least a portion of said gas flow from said primary gas mover to said heater means.

6. The system of claim 1 further including (a) a secondary heat exchanger having heat exchange element therein; (b) means for selectively directing at least a portion of said supply gas to said secondary heat exchanger across said heat exchange element; and (c) means for directing a fluid supply to be chilled through said secondary heat exchange element in heat exchange contact with said gas to chill said fluid.

7. The system of claim 6 further including a chilled fluid supply storage tank communicating with the chilled fluid discharged from said secondary heat exchanger and further including valve means for selectively returning a portion of the chilled fluid supply to the secondary auxiliary heat exchanger.

8. The system of claim 1 wherein said adsorptive media is selectively moveable in said adsorber means from a position in contact with the supply gas flow to a position in contact with the regenerative gas flow.

9. A process for treating a total stream of air to condition the same to provide a cooled supply air to a cooled area, said process comprising:
   (a) providing a total air supply from a primary air mover which total air supply is selected from ambient air, cooled supply air and return air from the cooled area;
   (b) treating the total air stream in an adsorber to dehumidify and cool the total air stream by contacting the air with an adsorbent material;
   (c) treating the dehumidified total air stream in an initial heat exchange chamber by flowing the total air along a first moisture-impervious surface to extract heat at substantially constant moisture conditions to produce a sensibly dry cooled air;
   (d) diverting a portion of the total stream of sensibly dry cooled air to establish an intermediate sensibly cooled stream;
   (e) treating the remaining total air stream in an adiabatic cooling zone in the initial heat exchange zone and thereafter dividing the remaining total air stream into a primary and secondary air flow;
   (f) directing the secondary air flow in a secondary heat exchange zone countercurrently to the total air stream along an absorbent surface adjacent said first moisture-impervious surface in heat exchange relationship with said total air flow to heat and humidify said secondary air flow;
   (g) directing at least a portion of the primary stream of dry cooled air to the area to be cooled; and
   (h) periodically regenerating the adsorbent material.

10. The process of claim 9 wherein the secondary air flow stream is recirculated and provided as part of the total air stream supplied to the primary air mover.

11. The process of claim 9 wherein the primary stream of dry cooled air is directed to a secondary liquid-to-air heat exchanger and indirectly contacted with a chilled fluid supply to cool the same.

12. The process of claim 11 wherein said chilled fluid supply discharged from said secondary heat exchanger is directed to a storage tank.

13. The process of claim 12 wherein at least a portion of the intermediate sensibly cooled stream is returned to the primary air mover.

14. The process of claim 9 wherein said adsorbent material is regenerated by subjecting it to a flow of heated air.

15. The process of claim 14 wherein said flow of heated air is outdoor air from an auxiliary fan.

16. The process of claim 14 wherein said flow of heated air is from said primary air mover.

17. A regenerative air cooling system for providing cooled air to a cooled area having a return, said system having a cooling mode and a regenerative mode and comprising:
   (a) a primary heat exchanger having a housing with a heat exchange element having a first moisture-impervious surface and a second opposite absorber surface, said heat exchange element extending in said housing and defining therewith a dry pre-cooling channel adjacent said first surface and a humidification and heating wet channel adjacent said second surface;
   (b) air mover means for directing total air flow through said dry channel to cool same;
   (c) means for directing part of the total air flow exiting said initial dry pre-cooling channel countercurrently through said heating and humidification channel of said initial heat exchanger in a secondary air stream to heat and humidify same and for establishing a separate primary cooled air flow to be directed to the cooled area;
   (d) regenerative adsorption means intermediate said air mover and said primary heat exchanger, said regenerative adsorption means having an inlet and an outlet, said inlet being in selective communication with said air mover during cooling and said outlet communicating with the inlet to said primary heat exchanger during cooling, said regenerative adsorber having first heat exchange means and second heat exchange means, said regenerative adsorption means further including dehumidification means; and
   (e) control means for directing cooling fluid to said first and second heat exchange means and supply air from said inlet to said outlet during the cooling mode of operation and for directing heat to said second heat exchange means and for directing air reversely through said heat exchanger from said outlet to said inlet during the regeneration mode of operation.

18. The air cooling system of claim 17 wherein said first and second heat exchange means comprise tube-type heat exchangers.

19. The air cooling system of claim 17 wherein said first and second heat exchange means comprise plate-type heat exchangers.

20. The air cooling system of claim 17 wherein said dehumidification means comprises an adsorbent coating on at least said first heat exchanger means.

21. The cooling system of claim 17 wherein:
   (a) said first heat exchange means of the adsorber is in selective communication with the outlet from the wet channel of the primary heat exchange; and
   (b) wherein said second heat exchange means of the adsorber is in selective communication with an external source of cooled fluid or an external source of heated fluid.

22. The cooling system of claim 17 further including second regenerative adsorption means arranged in parallel to said first regenerative adsorption means further including means for selectively regenerating one of said first and second regenerative adsorption means while the other of said first and second regenerative adsorption means is in the cooling mode of operation.

23. A process for treating a total stream of air to condition same to cool same for supply to a temperature controlled area including:
   (a) directing air to be treated to a regenerative adsorption unit with an inlet and outlet having first stage and second stage heat exchange element and dehumidification means to cool and dehumidify the supply air stream;
   (b) directing the discharge from the regenerative adsorption unit to an initial heat exchange zone and flowing the air along a first moisture-impervious surface to extract heat at substantially constant moisture conditions to produce a dry cooled air in the first stage;
   (c) diverting a portion of the total stream of the dry cooled air to establish a secondary air flow and a primary air flow;
   (d) directing the secondary air flow in a secondary heat exchange zone countercurrently to the total air stream along an absorbent surface adjacent said first moisture-impervious surface in heat exchange relationship with said total flow to heat and humidify said secondary air flow;

(e) directing the primary stream of dry cooled air to the temperature controlled zone; and (f) periodically regenerating said regenerative adsorption unit to reactivate the dehumidification means.

24. The process of claim 23 in which:

(a) said first heat exchange means in indirect heat exchanger relationship with said total air means and being connected to a source of cooled fluid in the cooling mode;

(b) said second heat exchange means in indirect heat exchange relationship with said total air and being connected to a source of cooled fluid in the cooling mode; and (c) said cooling fluid supply being terminated in the regeneration mode and said second heat exchange means being in communication with a heated fluid in the regeneration mode.

25. The process of claim 24 wherein said regenerative adsorption unit is regenerated by (a) interrupting the flow of total air to the inlet; (b) interrupting the supply of cooling fluid to said first and second heat exchangers; (c) initiating a flow of heated fluid to said second stage heat exchangers; and (d) inducing a flow of air reversely through the unit from the outlet to the inlet.

26. The process of claim 25 further including the step of heating reverse flow of air through the unit.

* * * * *